US 9,158,780 B2

(12) United States Patent
Hayashi et al.

(10) Patent No.: US 9,158,780 B2
(45) Date of Patent: Oct. 13, 2015

(54) INFORMATION STORAGE DEVICE AND INFORMATION SERVICE SYSTEM

(71) Applicant: Olympus Imaging Corp., Shibuya-ku, Tokyo (JP)

(72) Inventors: Toshikazu Hayashi, Sagamihara (JP); Kazuhiko Shimura, Tokyo (JP); Kazunobu Tasaka, Tokyo (JP)

(73) Assignee: OLYMPUS CORPORATION (JP)

( * ) Notice: Subject to any disclaimer, the term of this patent is extended or adjusted under 35 U.S.C. 154(b) by 451 days.

(21) Appl. No.: 13/693,546

(22) Filed: Dec. 4, 2012

(65) Prior Publication Data

US 2013/0097072 A1     Apr. 18, 2013

Related U.S. Application Data

(63) Continuation of application No. PCT/JP2010/059980, filed on Jun. 11, 2010.

(51) Int. Cl.
*G06F 17/30* (2006.01)
*G06F 13/00* (2006.01)

(52) U.S. Cl.
CPC .......... *G06F 17/30076* (2013.01); *G06F 13/00* (2013.01)

(58) Field of Classification Search
CPC ................................................ G06F 17/30076
USPC .......... 707/736, 754–758, 781, 999.101–102; 705/39
See application file for complete search history.

(56) References Cited

U.S. PATENT DOCUMENTS

| 2002/0035576 | A1* | 3/2002 | Kishimoto et al. ........... 707/200 |
| 2003/0149731 | A1 | 8/2003 | Ohwa |
| 2009/0025086 | A1 | 1/2009 | Fujita et al. |
| 2010/0049810 | A1* | 2/2010 | Maeda ........................... 709/206 |

FOREIGN PATENT DOCUMENTS

| JP | 2001197473 | 7/2001 |
| JP | 2002082887 A | 3/2002 |
| JP | 2002116988 | 4/2002 |

(Continued)

OTHER PUBLICATIONS

International Search Report of International Application No. PCT/JP2010/059980 dated Jul. 20, 2010 consisting of 2 pages.

(Continued)

*Primary Examiner* — Syling Yen
(74) *Attorney, Agent, or Firm* — Volpe and Koenig, P.C.

(57) ABSTRACT

The present invention provides an information storage device includes a first storage unit stores an arbitrary information file transmitted via a wide area information network, a second storage unit stores an information file in a predetermined form, which is derived from the first storage unit, an information file determination unit determines whether or not the information file in the first storage unit is the information file in the predetermined form, a file conversion unit converts an information file into the predetermined form, and a storage management unit manages the information file, and stores in the second storage unit. In the information storage device, if a copy of the information file in the first storage unit is not in the predetermined form when the copy is stored in the second storage unit, the copy converted into the information file in the predetermined form, and stored in the second storage unit.

18 Claims, 31 Drawing Sheets

(56) References Cited

FOREIGN PATENT DOCUMENTS

| JP | 2003216557 A | | 7/2003 |
|---|---|---|---|
| JP | 2003242080 A | * | 8/2003 |
| JP | 2005148796 | | 6/2005 |
| JP | 2006202012 | | 8/2006 |
| JP | 2008204068 A2 | | 9/2008 |
| WO | 2008102770 A1 | | 8/2008 |

OTHER PUBLICATIONS

Notice of Rejection Grounds issued on Aug. 6, 2013 in corresponding Japanese Patent Application No. 2012-519197 consisting of 7 pages including partial English translation.
Notice of Rejection issued in corresponding Chinese Patent Application No. 201080067266.8 on Oct. 21, 2014, consisting of 23 pp. (English translation provided).

* cited by examiner

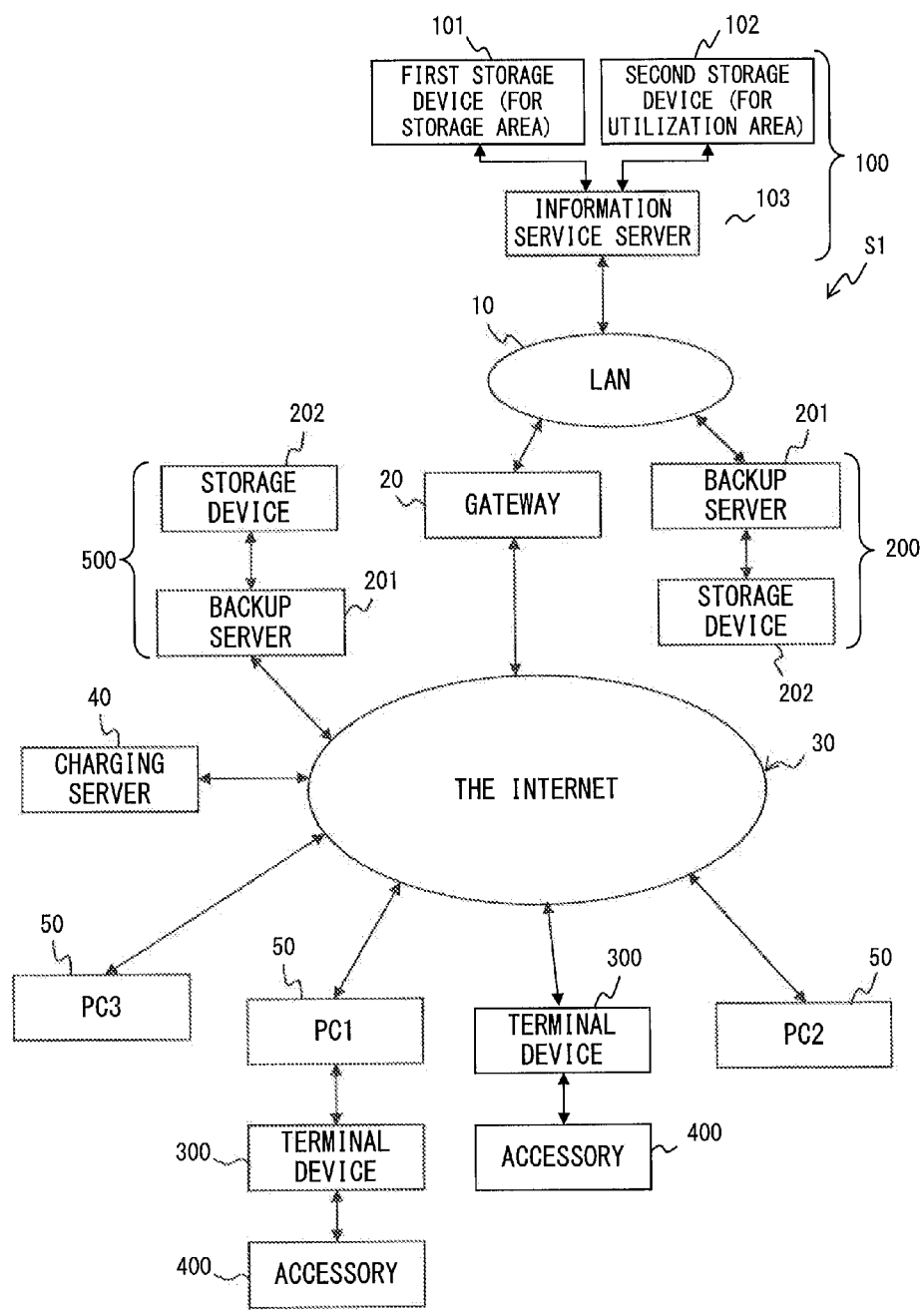
F I G. 1

STORAGE AREA MANAGEMENT DB (UTILIZATION AREA) 160A

| ATTRIBUTE | VALUE |
|---|---|
| AREA ID ~161 | AB000010 |
| MEMBER ID ~162 | USR010001 |
| EXPIRY DATE ~163 | 164 UNLIMITED |
| AREA SIZE(MByte) | 2000 |
| NUMBER OF FILES ~165 | 20 |
| FILE ID ~166 | FL020000123 |
| STORAGE ADDRESS ~167 | /DISK-B/USER/AB000010/ |
| FILE NAME ~168 | image0001,.jpg |
| FILE TYPE ~169 | 169a JPEG |
| BACKUP ADDRESS 1 | /Local/BACKUP/USER/AB000010/ |
| FILE ID | FL020000124 |
| STORAGE ADDRESS | /DISK-A/USER/AB000010/ |
| FILE NAME | image0002,.jpg |
| FILE TYPE | JPEG |
| BACKUP ADDRESS 1 | /Local/BACKUP/USER/AB000010/ |
| . | . |
| . | . |
| . | . |
| AREA ID | AB000123 |
| MEMBER ID | USR010002 |
| EXPIRY | UNLIMITED |
| AREA SIZE(MByte) | 1000 |
| NUMBER OF FILES | 12 |
| FILE ID | FL020054321 |
| STORAGE ADDRESS | /DISK-B/USER/AB000123/ |
| FILE NAME | diary20101208,.txt |
| FILE TYPE | TEXT |
| BACKUP ADDRESS 1 | /Local/BACKUP/USER/AB000123/ |
| . | . |
| . | . |
| . | . |

F I G. 5

STORAGE AREA MANAGEMENT DB (STORAGE AREA) 160B

| ATTRIBUTE | VALUE |
| --- | --- |
| AREA ID ～ 161 | CD0100111 |
| MEMBER ID ～ 162 | USR010001 |
| EXPIRY ～ 163 / 164 | 2011/3/25 |
| AREA SIZE(MByte) | 10000 |
| NUMBER OF FILES ～ 165 | 35 |
| FILE ID ～ 166 | FL020000123 |
| LOCK FLAG ～ 166a | 1 |
| STORAGE ADDRESS ～ 167 | /DISK-A/USER/CD0100111/ |
| FILE NAME ～ 168 | image0001,.jpg |
| FILE TYPE ～ 169 | JPEG |
| BACKUP ADDRESS 1 | /Local/BACKUP/USER/CD0100111/ |
| BACKUP ADDRESS 2 | /Europe/BACKUP/USER/CD0100111/ |
| BACKUP ADDRESS 3 | /US/BACKUP/USER/CD0100111/ |
| . | . |
| . | . |
| . | . |
| AREA ID | CD0100222 |
| MEMBER ID | USR010003 |
| EXPIRY | 2011/4/12 |
| AREA SIZE(MByte) | 5000 |
| NUMBER OF FILES | 15 |
| FILE ID | FL020074902 |
| STORAGE ADDRESS | /DISK-A/USER/CD0100222/ |
| FILE NAME | image0001,.jpg |
| FILE TYPE | JPEG |
| BACKUP ADDRESS 1 | /Local/BACKUP/USER/CD0100222/ |
| BACKUP ADDRESS 2 | /Europe/BACKUP/USER/CD0100222/ |
| BACKUP ADDRESS 3 | /US/BACKUP/USER/CD0100222/ |
| . | . |
| . | . |
| . | . |

169b points to BACKUP ADDRESS 1/2/3 group.

F I G. 6

SHARING MANAGEMENT DB 

| ATTRIBUTE | VALUE | |
|---|---|---|
| SHARING MANAGEMENT ID | FT000001 | ~ 171 |
| ADMINISTRATOR ID | USR010001 | ~ 172 |
| SHARED AREA ADDRESS | /DISK-B/USER/AB000010/GROUP001/ | ~ 173 |
| SHARING START DATE | 2010/12/26 | ~ 174 |
| SHARING END DATE | 2011/1/31 | ~ 175 |
| GUEST ID | USR010033 | |
| GUEST ID | USR010182 | |
| GUEST ID | abc123@pppmail.co.jp | } 176 |
| * | * | |
| * | * | |
| * | * | |
| SHARING MANAGEMENT ID | FT000002 | |
| ADMINISTRATOR ID | USR010002 | |
| SHARING AREA ADDRESS | /DISK-B/USER/AB00123/GROUP001/ | |
| SHARING START DATE | 2010/12/8 | |
| SHARING END DATE | 2011/3/1 | |
| GUEST ID | USR010851 | |
| GUEST ID | USR010950 | |
| GUEST ID | USR011478 | |
| * | * | |
| * | * | |
| * | * | |

| DEVICE TYPE ID 141 | DEVICE ID 142 | ALLOCATION SIZE (MByte) 143 | ALLOCATION START DATE 144 | ALLOCATION END DATE 145 |
|---|---|---|---|---|
| E-700 | E700000000001-E7000019999 | 5000 | 2010/12/1 | 2011/12/31 |
| FE-6010 | FE6010100000-FE6010399999 | 2000 | 2011/2/1 | 2011/12/31 |
| FE-6020 | FE6020000001-FE6020099999 | 2000 | 2011/5/1 | 2011/3/31 |
| ... | | | | |

DEVICE INFORMATION DB 140

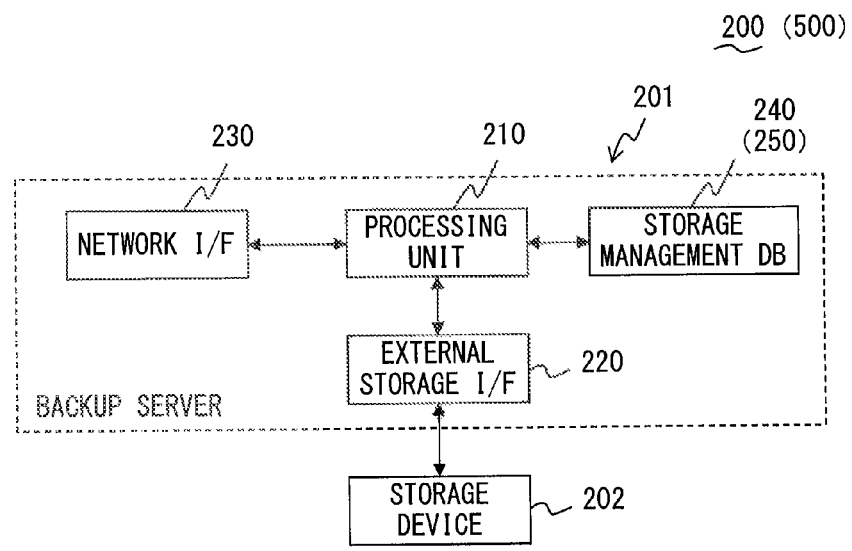
F I G. 9

FILE BACKUP MANAGEMENT DB 240 

| ATTRIBUTE | VALUE |
|---|---|
| 241 FILE ID | FL020000123 |
| 242 FILE NAME | image0001,.jpg |
| 243 MEMBER ID | USR010001 |
| 244 ORIGINAL STORAGE ADDRESS | /JP/DISK-A/USER/CD0100111/ |
| 245 BACKUP STORAGE ADDRESS | /Europe/BACKUP/USER/CD0100111/ |
| 246 BACKUP DATE AND TIME | 2010/12/20  11:34:06 |
| FILE ID | FL020000124 |
| FILE NAME | image0002,.jpg |
| MEMBER ID | USR010001 |
| ORIGINAL STORAGE ADDRESS | /JP/DISK-A/USER/CD0100111/ |
| BACKUP STORAGE ADDRESS | /Europe/BACKUP/USER/CD0100111/ |
| BACKUP DATE AND TIME | 2010/12/20  11:34:07 |
| . | . |
| . | . |
| . | . |

DATABASE BACKUP MANAGEMENT DB  250

| ATTRIBUTE | VALUE |
|---|---|
| DATABASE ID | USER-DB-JP-101 |
| FILE NAME | USER-DB101 |
| ORIGINAL ADDRESS | /JP/Service/KaiinKanri/ |
| BACKUP ADDRESS | /Europe/BACKUP/JP/Service/KaiinKanri/ |
| BACKUP DATE AND TIME | 2010/12/20 11:00:12 |
| DATABASE ID | AREA-DB-JP-019 |
| FILE NAME | AREA-DB009 |
| ORIGINAL ADDRESS | /JP/Service/Ryouiki/ |
| BACKUP ADDRESS | /Local/BackUp/JP/Service/Ryouiki/ |
| BACKUP DATE AND TIME | 2010/12/20 11:00:15 |

251 — DATABASE ID
252 — FILE NAME
253 — ORIGINAL ADDRESS
254 — BACKUP ADDRESS
255 — BACKUP DATE AND TIME

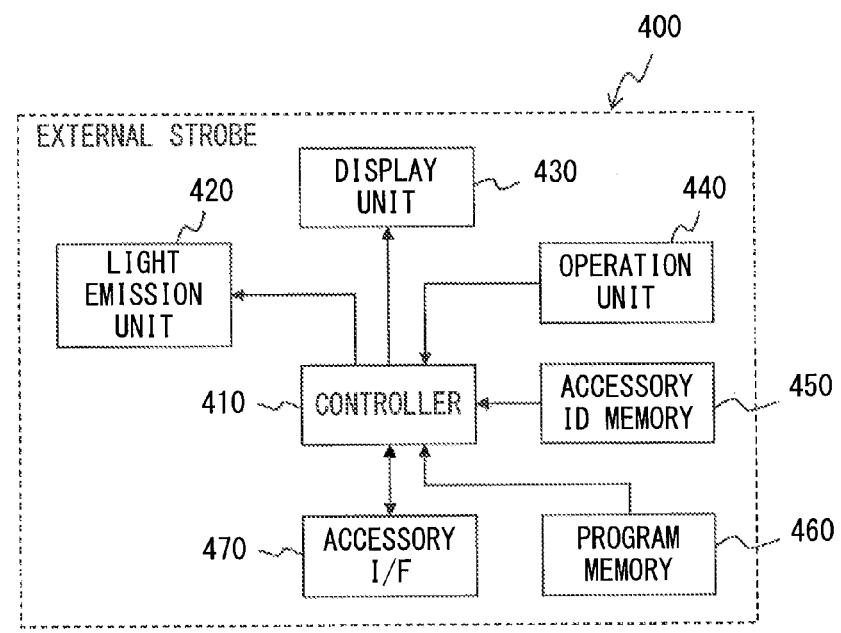
F I G. 1 4

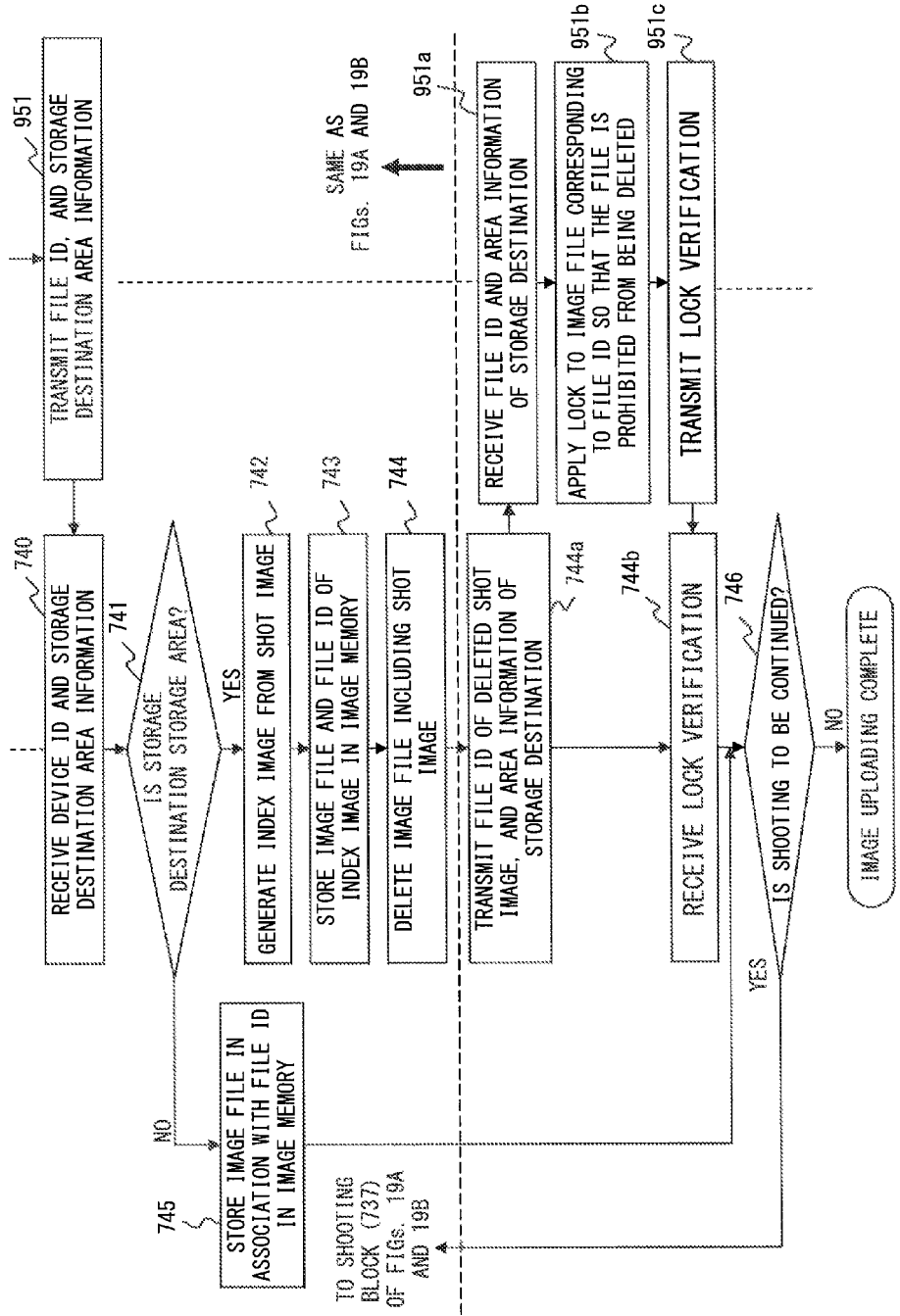

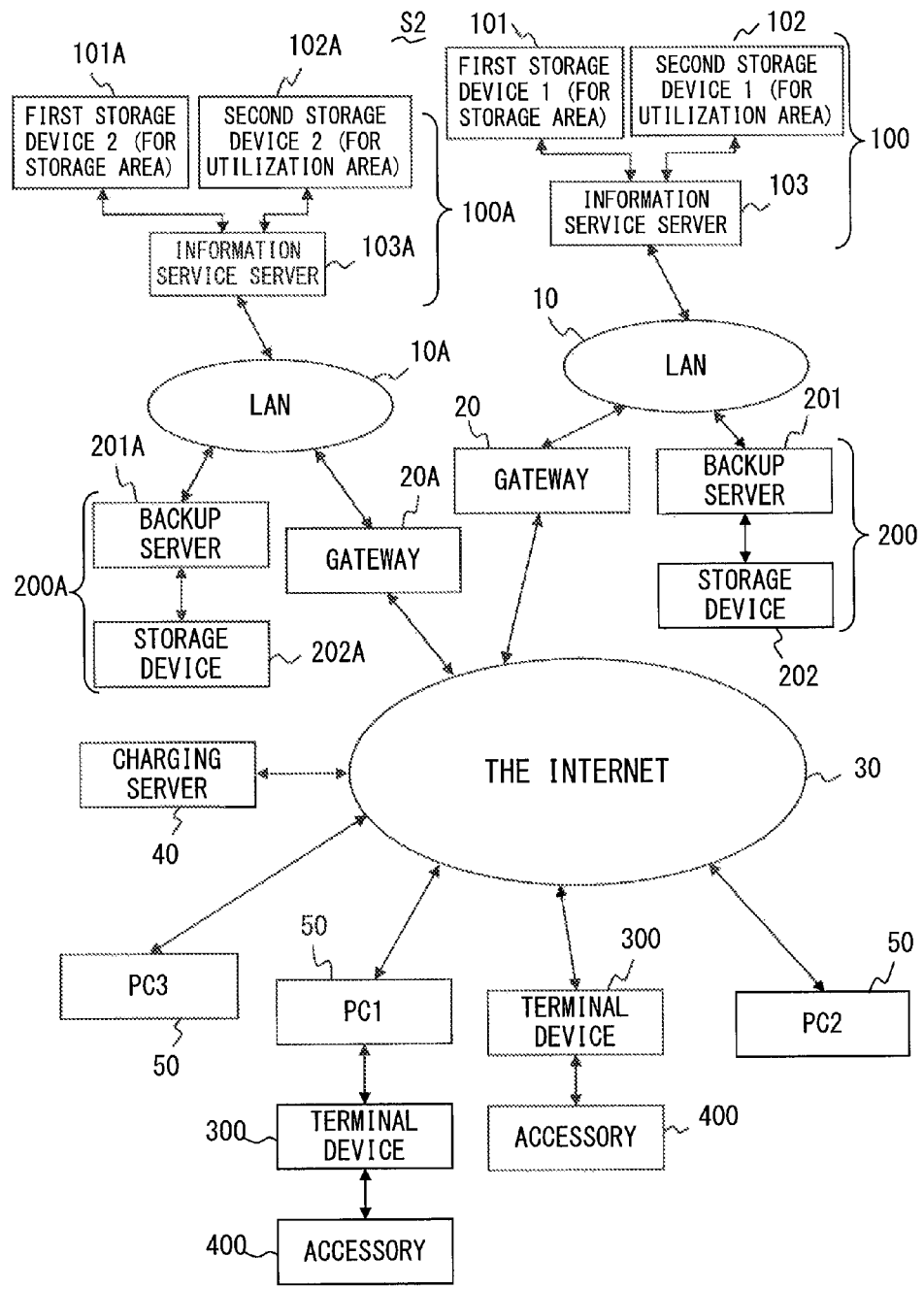
F I G. 2 5

INFORMATION STORAGE DEVICE AND INFORMATION SERVICE SYSTEM

CROSS-REFERENCE TO RELATED APPLICATION

This is a Continuation application of PCT Application No. PCT/JP2010/59980, filed on Jun. 11, 2010, which was not published under PCT Article 21(2) in English.

BACKGROUND OF THE INVENTION

1. Field of the Invention

The present invention relates to an information storage device and an information service system.

2. Description of the Related Art

With the popularization of high-performance digital cameras, even individuals have possessed a large amount of shot image data. Moreover, a service for storing information files of a customer in a server on the Internet with or without charge has been widely rendered owing to speed-up of an information network.

In the meantime, also a service for offering a storage area of a certain capacity in a server on the Internet to a customer who purchased a commodity such as a camera, an IC recorder or the like and made a user registration has been emerged. Especially, in a case where a camera, an IC recorder or the like is provided with a wireless communication function, shot image data or recorded voice data can be recorded without limitation on a storage capacity of an included memory by directly transmitting the image data or the voice data to the server. Moreover, it becomes easy to also use the image data or the voice data for various types of services prepared in the server. Accordingly, a technique of transmitting information generated by a portable device to an information storage server via a communication, and of managing the information is proposed.

For example, Patent Document 1 describes a server device that includes storage means where first and second storage areas are set, stores a shot image transferred from an electronic camera in the first storage area before a user registration, and moves the image stored in the first area to the second storage area and stores the image in the second storage area after the user registration. Moreover, the second storage area of the server device described in Patent Document 1 is allocated according to the number of cameras.

PRIOR ART DOCUMENT

Patent Document

[Patent Document 1] Japanese Laid-open Patent Publication No. 2008-204068

SUMMARY OF THE INVENTION

A first aspect of the present invention provides an information storage device for storing an information file of a registered member. The information storage device includes: a first storage unit configured to store an arbitrary information file transmitted from the registered member via a wide area information network; a second storage unit configured to store an information file in a predetermined form, which is derived from the information file stored in the first storage unit; an information file determination unit configured to determine whether or not the information file is the information file in the predetermined form; a file conversion unit configured to convert the information file into the information file in the predetermined form; and a storage management unit configured to manage the information file stored in the first storage unit, and the information file stored in the second storage unit, wherein the storage management unit converts a copy of the file stored in the first storage unit into the information file in the predetermined with the file conversion unit and stores the copy in the second storage unit if the information file determination unit determines that the copy is not in the predetermined form when the copy is stored in the second storage unit.

A second aspect of the present invention provides an information service system where an information storage device and an external device operated by a registered member are connected to a wide area information network, wherein: the information storage device includes a first storage unit configured to store an arbitrary information file transmitted from the external device via the wide area information network, a second storage unit configured to store an information file in a predetermined form, which is derived from the information file stored in the first storage unit, an information file determination unit configured to determine whether or not the information file is the information file in the predetermined form, a file conversion unit configured to convert the information file into the information file in the predetermined form, and a storage management unit configured to manage the information file stored in the first storage unit, and the information file stored in the second storage unit; the external device includes a storage medium for storing the information file, an information file selection unit configured to select the information file stored on the storage medium, and an information file transmission unit configured to transmit the information file selected by the information file selection unit to the information storage device via the wide area information network, wherein the storage management unit converts a copy of the information file stored in the first storage unit into the information file in the predetermined form with the file conversion unit and stores the copy in the second storage unit if the information file determination unit determines that the copy is not in the predetermined form when the copy is stored in the second storage unit.

BRIEF DESCRIPTION OF THE DRAWINGS

FIG. 1 is a conceptual schematic illustrating a configuration example of an information network including an information storage device and an information service system according to an embodiment of the present invention;

FIG. 5 is a conceptual schematic illustrating a configuration example of a storage area management DB used by the information storage device according to the embodiment of the present invention;

FIG. 6 is a conceptual schematic illustrating a configuration example of the storage area management DB used by the information storage device according to the embodiment of the present invention;

FIG. 7 is a conceptual schematic illustrating a configuration example of a sharing management DB used by the information storage device according to the embodiment of the present invention;

FIG. 8 is a conceptual schematic illustrating a configuration example of a device information DB used by the information storage device according to the embodiment of the present invention;

FIG. 9 is a conceptual schematic illustrating a configuration example of a backup system connected to the information storage device according to the embodiment of the present invention;

FIG. 10 is a conceptual schematic illustrating a configuration example of a file backup management DB used by the information storage device according to the embodiment of the present invention;

FIG. 11 is a conceptual schematic illustrating a configuration example of a database backup management DB used by the information storage device according to the embodiment of the present invention;

FIG. 14 is a conceptual schematic illustrating a configuration example of an accessory connected to the terminal device according to the embodiment of the present invention;

FIG. 20 is a flowchart illustrating an example of a process for protecting an information file in a storage area from a deletion operation in the information service system according to the embodiment of the present invention;

FIG. 25 is a conceptual schematic illustrating a configuration example of an information storage device and an information service system according to another embodiment of the present invention.

DESCRIPTION OF THE PREFERRED EMBODIMENT

Figure 2:
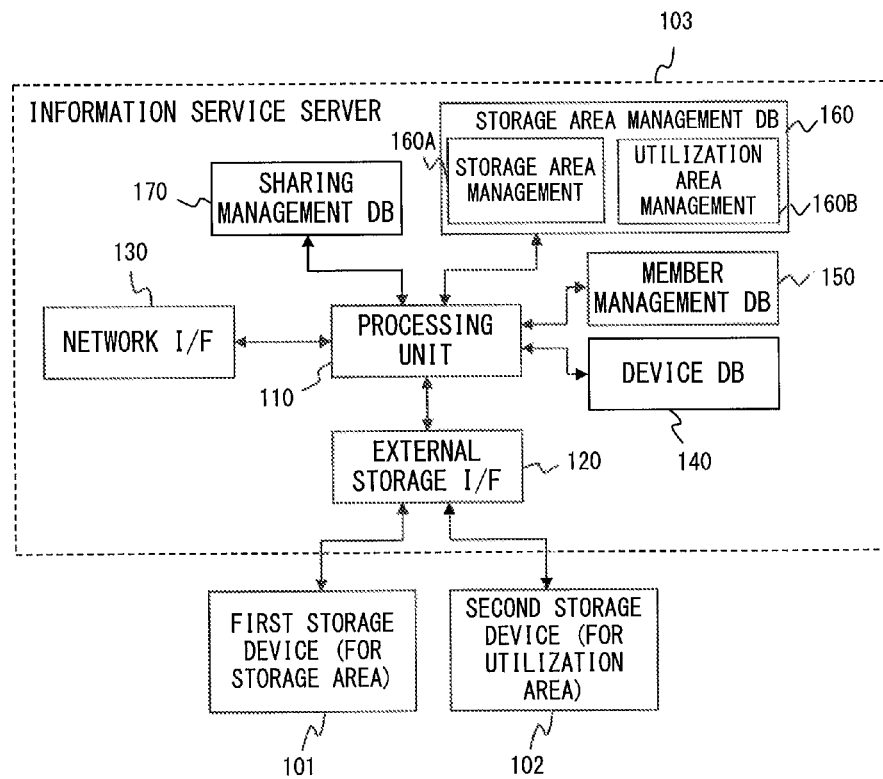
FIG. 2 is a conceptual schematic illustrating a configuration example of the information storage device according to the embodiment of the present invention.

According to an embodiment, two types of information storage servers are provided in an information storage device. The first server that offers a storage area with a charge to a member accepts an information file in an arbitrary form transmitted from the member, whereas the second server that offers a storage area with no charge accepts an information file in a predetermined form.

The information file stored in the second server is locally backed up, for example, in a local backup system within the same LAN, and the information file stored in the second server is locally backed up and also backed up in a geographically remote backup system via a wide area information network.

The information file stored in the second server can be edited by a person that possesses the information file, and can be shared with a third party. The information file stored in the first server cannot be shared with a third party, and is protected from being edited even by the person who possesses the information file.

When information data is transmitted from a terminal device and stored in the first server as an information file, the first server transmits deletion permission information for the information data to the terminal device side, so that the terminal device is enabled to delete the information data permitted to be deleted.

Additionally, if the information file stored in the first server is deleted by the terminal, information indicating that the file has been deleted is transmitted to the first server, and the information file stored in the second server is protected from being deleted with a normal deletion procedure.

Furthermore, a server at a storage destination of an information file can be set in advance for each terminal device.

Embodiments according to the present invention are described in detail below with reference to the drawings.

In the following description, identification information, a database, and an interface are respectively abbreviated to ID, DB, and I/F.

FIG. 1 is a conceptual schematic illustrating a configuration example of an information network including an information storage device and an information service system according to an embodiment of the present invention.

The information service system S1 according to this embodiment includes an information storage device 100 that accepts an access made from a network terminal 50 (external device) and a terminal device 300 (external device), which will be described later, via an information network.

The information storage device 100 according to this embodiment includes an information service server 103, and a first storage device 101 (first storage unit) and a second storage device 102 (second storage unit), which are connected to the information service server 103.

To the information storage device 100, a local backup system 200 (first backup storage device) is connected via a LAN (Local Area Network) 10.

The LAN 10 (local area information network) to which the information storage device 100 and the local backup system 200 are connected is connected to an upper-level Internet 30 (wide area information network) via a gateway 20.

To the Internet 30, a remote backup system 500 (second backup storage device) accessed by the information storage device 100, and a charging server 40 are connected.

To the Internet 30, also a network terminal 50 and a terminal device 300, which are possessed by a person who uses the information storage device 100, are connected.

The information service system S1 according to this embodiment renders a service for storing an information file transmitted by the network terminal 50 or the terminal device 300, which is possessed by a user, in the information storage device, or for releasing the information file.

In the case of this embodiment, a size of a storage area with no charge of an information file in the information storage device 100 is allocated, for example, according to a type or an attribute of the terminal device 300 or an accessory 400 registered by the user.

In the case of this embodiment, the terminal device 300 is, for example, a camera, and the accessory 400 is, for example, a replacement lens, a strobe or another accessory, which is attached/detached to/from the camera.

For a storage area with a charge in the information storage device 100, a size desired by a user is allocated according to a contract with the user.

FIG. 2 is a conceptual schematic illustrating a configuration example of an information storage device according to an embodiment of the present invention.

Figure 3:
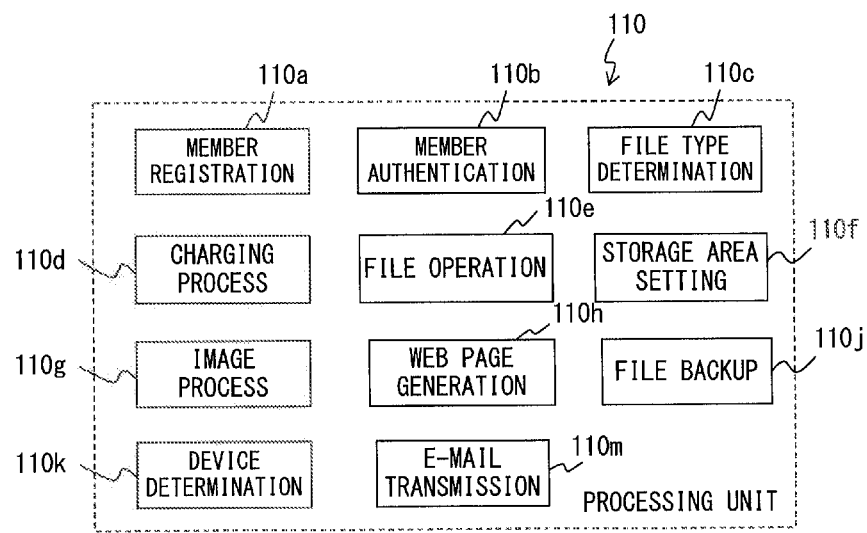
FIG. 3 is a conceptual schematic illustrating a configuration example of a processing unit in the information storage device according to the embodiment of the present invention.

FIG. 3 is a conceptual schematic illustrating a configuration example of a processing unit in the information storage device according to the embodiment of the present invention.

The information storage device 100 according to this embodiment includes an information service server 103, and a first storage device 101 and a second storage device 102, which are connected to the information service server 103.

In the case of this embodiment, the first storage device 101 is a storage area for safely storing an information file possessed by a user, and offered to the user with a charge. For the storage area of the first storage device 101, a storage duration according to a charge is set.

The second storage device 102 is a utilization area used to store, share, or release an information file, and offered to a user with no charge.

The information service server 103 includes a processing unit 110 (storage management means), an external storage I/F 120, a network I/F 130 (communication means), a device information DB 140, a member management DB 150, a storage area management DB 160, and a sharing management DB 170.

The processing unit 110 is configured with a computer or the like, and implements various types of control functions illustrated in FIG. 3 by hardware or software, or by combining hardware and software.

The external storage I/F 120 controls an information input/output to/from the first storage device 101 and the second storage device 102.

The network I/F 130 controls an information input/output to/from the LAN 10.

In the case of this embodiment, the processing unit 110 includes a member registration function 110a, a member authentication function 110b, a file type determination function 110c, a charging processing function 110d, a file operation function 110e, a storage area setting function 110f, an image processing function 110g, a WEB page generation function 110h, a file backup function 110j, a device determination function 110k, and an electronic mail function 110m.

The member registration function 110a executes a process for registering a user who uses the information storage device 100 as a member as will be described later.

Additionally, the member registration function 110a in this embodiment extracts a storage area that has reached an expiry date within a storage area with a charge in the first storage device 101, makes a setting for extending the expiry date of the extracted storage area by a predetermined duration, and requests the charging processing function 110d to cause the charging server 40 for managing a settlement account of a member to whom the area that has reached the expiry date is allocated to charge a cost for extending the expiry date by the predetermined duration.

The member authentication function 110b executes a process for authenticating a member who uses the information storage device 100 as will be described later.

The file type determination function 110c executes a process for determining various types of attributes of an information file as will be described later.

The charging processing function 110d executes a process for charging a member in cooperation with the charging server 40 when a service with a charge is rendered as will be described later.

The file operation function 110e executes a process for implementing various types of operations for a file that is stored in the information storage device 100 as an information file as will be described later.

The storage area setting function 110f processes a control for allocating a storage area of an information file in the information storage device 100 as will be described later.

The image processing function 110g executes processes such as a process for reducing a size of an image file as will be described later.

The WEB page generation function 110h executes a process for releasing an information file stored in the information storage device 100, or for generating a home page intended to share the information file with another member.

The file backup function 110*j* executes a process for storing a copy of an information file stored in the information storage device 100 in the local backup system 200 or the remote backup system 500 as will be described later.

The device determination function 110*k* executes a process for determining a device type or an attribute of the terminal device 300 or the accessory 400.

The electronic mail function 110*m* transmits/receives e-mail to/from the network terminal 50 or the terminal device 300, which is possessed by a user, as will be described later.

Figure 4:
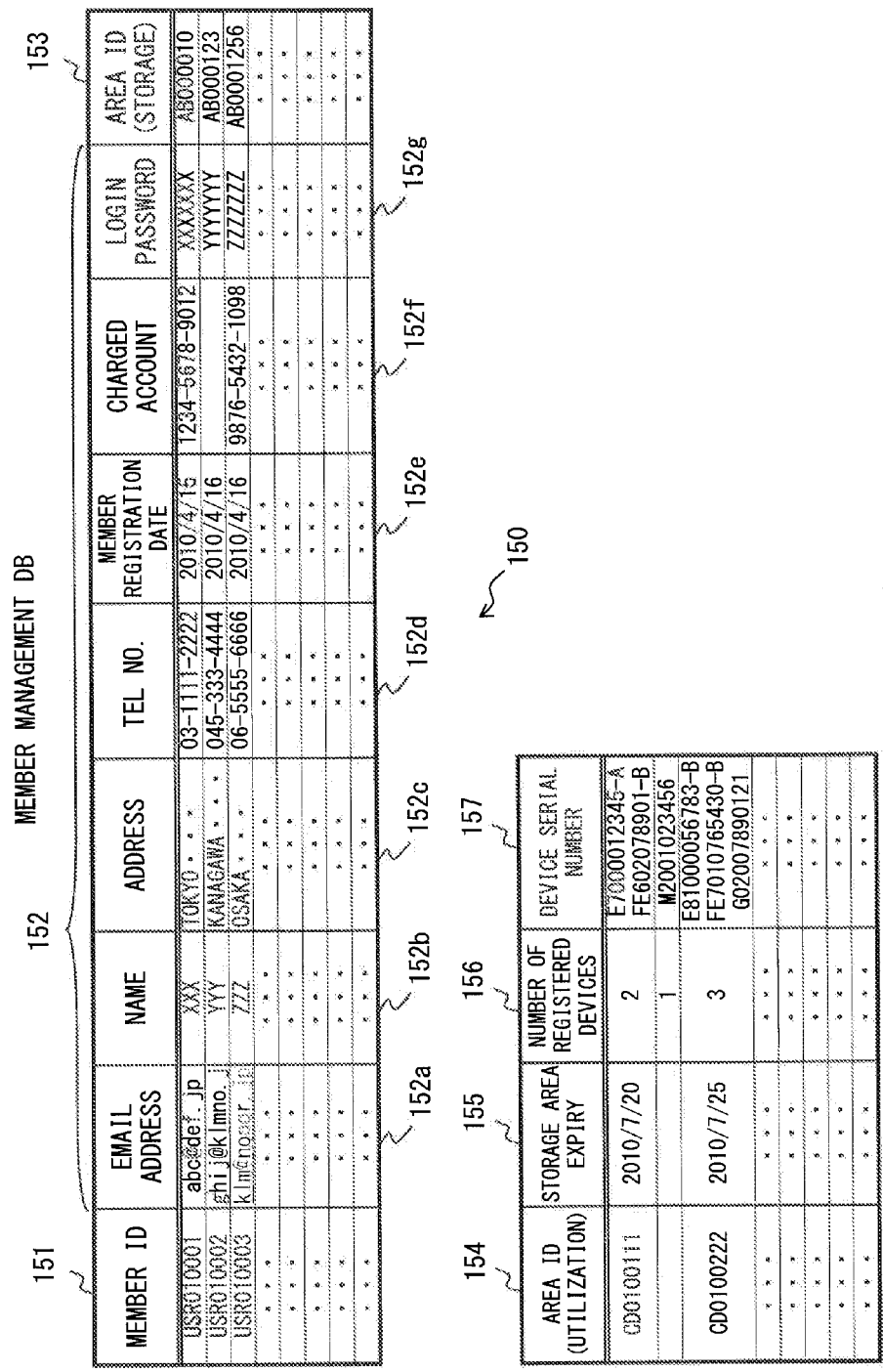
FIG. 4 is a conceptual schematic illustrating a configuration example of a member management DB used by the information storage device according to the embodiment of the present invention.

FIG. 4 is a conceptual schematic illustrating a configuration example of the member management DB used by the information storage device 100 according to this embodiment.

The member management DB 150 is used to manage a user who is registered as a member.

The member management DB 150 according to this embodiment is configured to manage a member ID 151, personal information 152, a storage area ID 153, a utilization area ID 154, a storage area expiry 155, the number of registered devices 156, and a device serial number 157 by using the member ID 151 as a key.

The storage area ID 153 is information for identifying an area of the first storage device 101 allocated to the member.

The utilization area 154 is information for identifying an area of the second storage device 102 allocated to the member.

The storage area expiry 155 is information indicating a storage limit of an area identified with the storage area ID 153.

The number of registered devices 156 is information indicating the number of terminal devices 300 or accessories that the member registered as a user.

The device serial number 157 is information for identifying the terminal device 300 or the accessory 400, which is registered as a user.

The personal information 152 is composed of an e-mail address 152*a*, a name 152*b*, an address 152*c*, a telephone number 152*d*, a member registration date 152*e*, a charged account 152*f*, and a login password 152*g*.

FIGS. 5 and 6 are conceptual schematics illustrating a configuration example of the storage area management DB used by the information storage device according to this embodiment.

As illustrated in FIGS. 5 and 6, the storage area management DB 160 in this embodiment is composed of a utilization area management DB 160A for managing the second storage device 102, and a storage area management DB 160B for managing the first storage device 101.

As illustrated in FIG. 5, the utilization area management DB 160A stores information such as an area ID 161, a member ID 162, an expiry 163, an area size 164, the number of files 165, a file ID 166, a storage address 167, a file name 168, a file type 169, a backup address 169*a* and the like.

The area ID 161 is information for identifying an allocated area in the second storage device 102.

The member ID 162 is information for identifying a member who possesses a storage area identified with the area ID 161.

The time limit 163 is information indicating an expiry date of the storage area identified with the area ID 161.

The area size 164 is information indicating a size of the storage area identified with the area ID 161.

The number of files 165 is information indicating the number of information files stored in the storage area identified with the area ID 161.

The file ID 166 is information for identifying individual information files stored in the storage area identified with the area ID 161.

The storage address 167 is information for identifying a storage position of an information file having the file ID 166 in the storage area identified with the area ID 161.

The file name 168 is a name of the information file identified with the file ID 166.

The file type 169 is information indicating a type (TIFF, JPEG, WAVE or the like) of the information file identified with the file ID 166.

The backup address 169*a* is information for identifying a position where a copy of the information file identified with the file ID 166 is stored. In this case, the copy of the information file in the second storage device 102 is stored in the local backup system 200. Therefore, the backup address 169*a* indicates a storage position in the local backup system 200.

In contrast, as illustrated in FIG. 6, the storage area management DB 160B for managing an information file in the first storage device 101 is fundamentally the same as the above described utilization area management DB 160A. In the case of this embodiment, a copy of the information file in the first storage device 11 is also stored in the remote backup system 500 in addition to the local backup system 200.

Accordingly, the storage area management DB 160B in this embodiment is different from the utilization area management DB 160A in that backup addresses 2 to 3 (169*b*) indicating storage positions of copies of the information file respectively in the remote backup systems 500 at two sites are included in addition to the backup address 1 indicating the storage position of the copy of the information file in the local backup system 200, and a lock flag 166*a* is added. The lock flag 116*a* is a flag for controlling whether or not to prohibit a deletion operation of an information file identified with the file ID 166. For example, an information file is prohibited from being deleted if the lock flag 166*a* is set to "1", or the information file is released from being deleted if the lock flag 166*a* is set to "0".

The backup address 2 indicates a storage position of the copy of the information file in the remote backup system 500, and the backup address 3 indicates a storage position of the copy in another remote backup system not illustrated.

FIG. 7 is a conceptual schematic illustrating a configuration example of the sharing management DB used by the information storage device according to this embodiment.

In the case of this embodiment, part of a storage area in the second storage device 102, which is allocated to a member (administrator), is set as a shared area so that members other than the member to whom the storage area is allocated can reference an information file. Therefore, an information file of the administrator, which is located in the shared area, can be referenced also by a member permitted by the administrator. The sharing management DB 170 is used to manage a shared area.

As illustrated in FIG. 7, the sharing management DB 170 in this embodiment is composed of a sharing management ID 171, an administrator ID 172, a shared area address 173, a sharing start date 174, a sharing end date 175, and a guest ID 176.

The sharing management ID 171 is information for identifying each shared area in the second storage device 102.

The administrator ID 172 is information for identifying a member, who is an administrator of a shared area identified with the sharing management ID 171.

The shared area address 173 is information indicating a position in the shared area in the second storage device 102.

The sharing start date 174 and the sharing end date 175 are information respectively indicating sharing start date and time and sharing end date and time of the shared area.

The guest ID 176 is information for identifying a guest who is permitted to access the shared area identified with the shared area address 173. If the guest is a member, the guest ID 176 is a member ID 151 registered to the member management DB 150. If the guest is not a member, the guest ID 176 is an e-mail address that a user (administrator) inputs in step 757 of FIG. 22A to be described later and is transmitted to a service server in step 758.

FIG. 8 is a conceptual schematic illustrating a configuration example of the device information DB used by the information storage device according to this embodiment.

The device information DB 140 is used to stipulate and manage an allocation amount of a storage area in the second storage device 102, which is allocated to a member, according to a type of a device such as the terminal device 300, the accessory 400 or the like possessed by the member.

As illustrated in FIG. 8, the device information DB 140 is composed of information such as a device type ID 141, a device ID 142, an allocation size 143, an allocation start date 144, and an allocation end date 145.

The device type ID 141 is information for identifying a device type of the terminal device 300 such as a camera or the like, and that of the accessory 400.

The device ID 142 is information indicating a range of identification numbers allocated to devices of a type identified with the device type ID 141.

The allocation size 143 is information indicating a size of a storage area in the second storage device 102, which is allocated with no charge, for each device identified with the device type ID 141 and the device ID 142.

The allocation start date 144 and the allocation end date 145 are information respectively indicating a date when a storage area starts to be allocated, and a date when the storage area ends to be allocated.

Configuration examples of the local backup system 200 and the remote backup system 500 for storing a copy of an information file stored in the information storage device 100 according to this embodiment are described next.

The local backup system 200 is provided within the same network as the information storage device 100, and connected to a shared LAN 10.

In the case of this embodiment, a copy of an information file stored with a charge in the first storage device 101 of the information storage device 100, and a copy of the information file stored with no charge in the second storage device 102 are stored in the local backup system 200.

In the meantime, the remote backup system 500 is installed in an area that is geographically remote from the information storage device 100, and connected to the information storage device 100 via the Internet 30, the gateway 20, and the LAN 10.

FIG. 9 is a conceptual schematic illustrating a configuration example of the backup system connected to the information storage device according to the embodiment of the present invention.

As illustrated in FIG. 9, the local backup system 200 according to this embodiment includes a backup server 201 and a storage device 202.

The backup server 201 includes a processing unit 210, an external storage I/F 220, a network I/F 230, and a file backup management DB 240.

The processing unit 210 is configured with a computer or the like for controlling the whole of the backup server 201.

The external storage I/F 220 controls an information input/output to/from a subordinate storage device 202.

The network I/F 230 controls an information input/output to/from an information network such as the LAN 10 or the Internet 30.

The remote backup system 500 is the same as the local backup system 200 except that a database backup management DB 250 is provided in addition to the file backup management DB 240.

FIG. 10 is a conceptual schematic illustrating a configuration example of the file backup management DB used by the information storage device according to this embodiment.

The file backup management DB 240 included in the local backup system 200 and the remote backup system 500 stores information such as a file ID 241, a file name 242, a member ID 243, an original storage address 244, a backup storage address 245, backup date and time 246, and the like.

The file ID 241 is information for identifying a stored information file, and corresponds to the above described file ID 166.

The file name 242 is the name of the information file, and corresponds to the file name 168 of the information file at a copy source.

The member ID 243 is information indicating a person who possesses the copy of the information file, and corresponds to the above described member ID 162.

The original storage address 244 is information indicating a storage position of the information file at the copy source in the first storage device 101.

The backup storage address 245 is information indicating a storage position of the copy of the information file in the local backup system 200 or the remote backup system 500.

The backup date and time 246 indicates date and time when the information file is copied from the first storage device 101 or the second storage device 102 and stored.

FIG. 11 is a conceptual schematic illustrating a configuration example of the database backup management DB used by the information storage device according to this embodiment.

The database backup management DB 250 included in the remote backup system 500 stores a database ID 251, a file name 252, an original address 253, a backup address 254, and backup date and time.

The database ID 251 is information for identifying a copy of an archive of a database provided in the information storage device 100 where original information of an information file and the like are stored.

The file name 252 is information indicating a name of a copy of the database, the original address 253 is information indicating a position where a database at a copy source is located, the backup address 254 is information indicating a storage position of the copy of the database, and the backup date and time 255 is information indicating date and time when the database is copied and stored.

The original database of the information storage device 100 is identified with the database ID 251, and the storage position of the database in the information storage device 100 is identified with the original address 253.

Configuration examples of the network terminal 50, the terminal device 300, and the accessory 400 of a user who uses the information storage device 100 according to this embodiment are described next.

Figure 12:
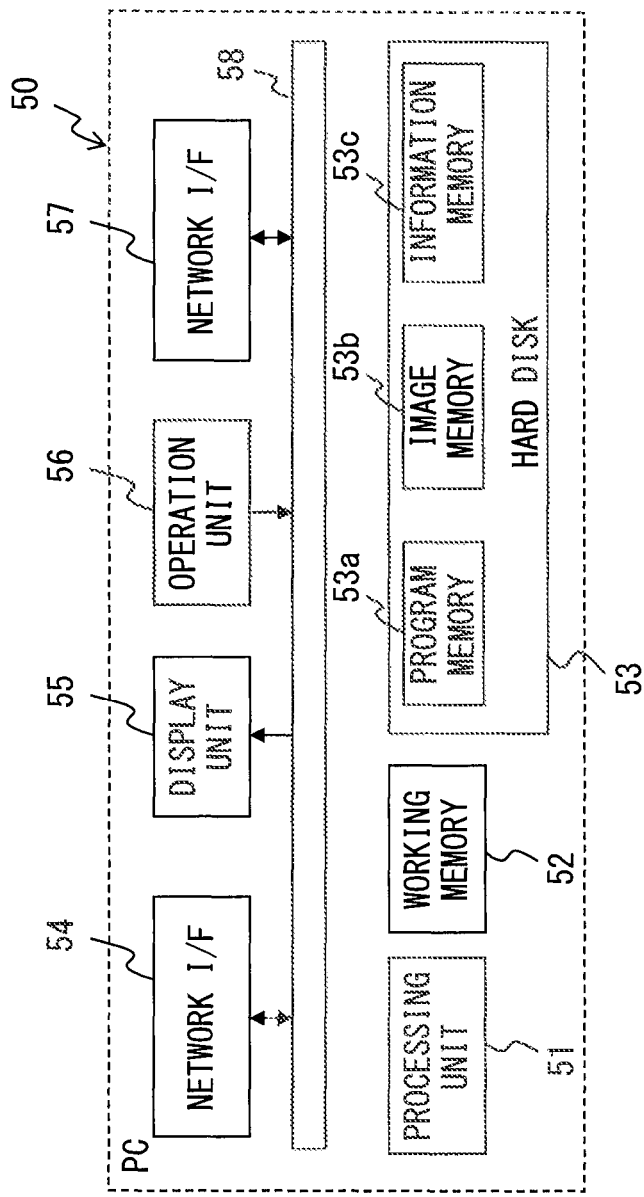
FIG. 12 is a conceptual schematic illustrating a configuration example of a network terminal connected to the information storage device according to the embodiment of the present invention.

FIG. 12 is a conceptual schematic illustrating a configuration example of the network terminal 50 connected to the information storage device according to the embodiment the present invention.

The network terminal 50 in this embodiment is configured, for example, with a personal computer.

Namely, in the network terminal 50, for example, a processing unit 51, a working memory 52, a hard disk 53, a communication I/F 54, a display unit 55, an operation unit 56, and a network I/F 57 are connected via an information transmission path 58, and mutually exchange information.

The processing unit 51 is, for example, a microprocessor. The working memory 52 is a main storage for storing a program executed by the processing unit 51, and data.

The hard disk 53 offers a nonvolatile storage area such as a program memory 53a, an image memory 53b, an information memory 53c, and the like.

The communication I/F 54 offers a connection function of communicating information with a terminal device 300 to be described later. Specifically, the communication I/F 54 is configured with a universal wired connection interface such as USB or the like, a near field wireless communication interface, an infrared communication interface or the like.

The display unit 55 is configured with a display for visualizing and displaying an information file.

The operation unit 56 offers a user input function such as a keyboard, a pointing device or the like.

The network I/F 57 offers a function of connecting to the LAN 10 or the Internet 30.

Namely, the network terminal 50 according to this embodiment can execute a process for extracting an information file such as an image file or the like from the terminal device 300 such as a camera or the like connected via the communication I/F 54, for storing the information file in the image memory 53b or the information memory 53c, and for transmitting the file to the information storage device 100 and making the information storage device 100 store the file as a replacement for the terminal device 300.

Figure 13:
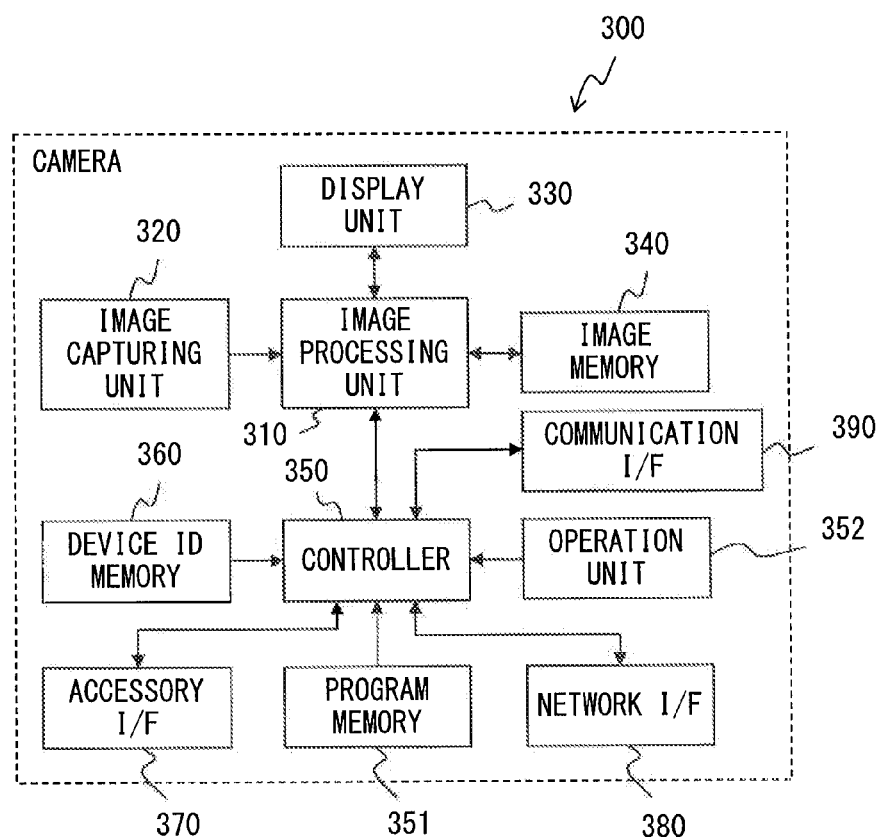
FIG. 13 is a conceptual schematic illustrating a configuration example of a terminal device connected to the information storage device according to the embodiment of the present invention.

FIG. 13 is a conceptual schematic illustrating a configuration example of the terminal device 300 connected to the Internet 30 or the terminal device 300, which is connected to the information storage device 100, according to the embodiment of the present invention.

The terminal device 300 according to this embodiment is configured, for example, with a camera such as a digital camera, a video camera or the like, and generates an image file such as a still image, a voiced moving image, or the like as an information file.

Namely, as illustrated in FIG. 13, the terminal device 300 according to this embodiment is configured with a camera including an image processing unit 310, an image capturing unit 320, a display unit 330, an image memory 340, a controller 350, a program memory 351, an operation unit 352, a device ID memory 360, an accessory I/F 370, a network I/F 380, and a communication I/F 390.

The image capturing unit 320 is composed of an image capturing element for shooting a still image or a moving image, and an optics system. The image processing unit 310 controls the image capturing unit 320, processes the still image or the moving image shot by the image capturing unit 320, and stores the image in the image memory 340 as an image file in a desired format.

The display unit 330 is a display for displaying an image of a subject shot by the image capturing unit 320 in real time, for displaying an index image of image data included in an image file stored in the image memory, and for further displaying various types of selection menus and operation information.

The controller 350 is configured with a microprocessor or the like that controls the whole of the terminal device 300. The controller 350 implements various types of controls to be described later by executing a program stored in the program memory 351.

The device ID memory 360 stores information such as a manufacturing number unique to the terminal device 300, a device type code and the like. Specifically, the above described device ID 142 and device type ID 141 are stored.

The accessory I/F 370 offers a function of connecting and communicating with the accessory 400.

The network I/F 380 offers a function of connecting to the Internet 30 wiredly or wirelessly. The communication I/F 390 offers a function of connecting to the communication I/F 54 of the network terminal 50 wiredly or wirelessly.

Namely, the terminal device 300 according to this embodiment is enabled to be used not only by being indirectly connected to the Internet 30 via the network terminal 50 but by being directly connected to the Internet 30 not via the network terminal 50. The image memory 340 stores an information file received via the network I/F 380 or the communication I/F 390 in addition to an image file. Moreover, the terminal device 300 has a WEB browser function in order to use a service rendered by the information service server 103 by accessing the information service server 103 via the Internet. A WEB page received via the communication I/F 390 is displayed on the display unit 330.

FIG. 14 is a conceptual schematic illustrating a configuration example of an accessory connected to the terminal device according to the embodiment of the present invention.

The accessory 400 in this embodiment is an accessory such as a replacement lens, a strobe or the like connected to a camera as the terminal device 300.

In the case of this embodiment, for example, if a service rendered by the information service server 103 is used by the terminal device 300 to which the accessory 400 is connected, the terminal device 300 transmits information for identifying the accessory 400 to the information service server 103 along with information for identifying the local terminal device 300.

If the service rendered by the information service server is a member registration, a storage area of an information file is offered with no charge in the second storage device 102 of the information storage device 100 according to the information for identifying the terminal device 300 or the information for identifying the accessory 400, which has been received by the information service server 103 simultaneously with the member registration. In the meantime, if the service rendered by the information service server is a service for a member, and if it is determined that the terminal device 300 or the accessory 400 is not registered as a user according to the information for identifying the terminal device 300 or the information for identifying the accessory 400, which has been received by the information service server 103, a user registration is made, and the storage area with no charge of the information file is expanded in the second storage device 102 of the information storage device 100 according to information for identifying the registered device.

A configuration example in a case where the accessory 400 is, for example, a strobe externally attached to the camera is described with reference to FIG. 14.

The accessory 400 includes a controller 410, a light emission unit 420, a display unit 430, an operation unit 440, an accessory ID memory 450, a program memory 460, and an accessory I/F 470.

The controller 410 is configured, for example, with a microcomputer or the like, and controls the whole of the accessory 400. The light emission unit 420 is composed of components such as a lamp that emits light at timing and for a duration as instructed from the controller 410, and a capacitor for supplying an electric current to the lamp.

The display unit 430 is a display for visualizing and presenting an operation state of the accessory 400 to a user.

The operation unit 440 is configured with an information input mechanism, such as a switch, a dial, a button, a dip switch or the like, with which a user inputs control information to the controller 410.

The accessory ID memory 450 stores information such as a device type number, a manufacturing number, or the like, which is intended to identify the accessory 400. Specifically, information such as the above described device type ID 141, device ID 142, and the like are stored.

The program memory 460 stores information such as a control program to be executed by the controller 410.

The accessory I/F 470 offers a function of connecting to the accessory I/F 370 of the terminal device 300, and of communicating information.

One example of actions of the information storage device and the information service system according to this embodiment is described in detail below with reference to flowcharts. In the flowcharts described below, symbols A, B and C enclosed with a circle represent a connection relationship of the flowcharts separated into two figures.

Figure 15A:
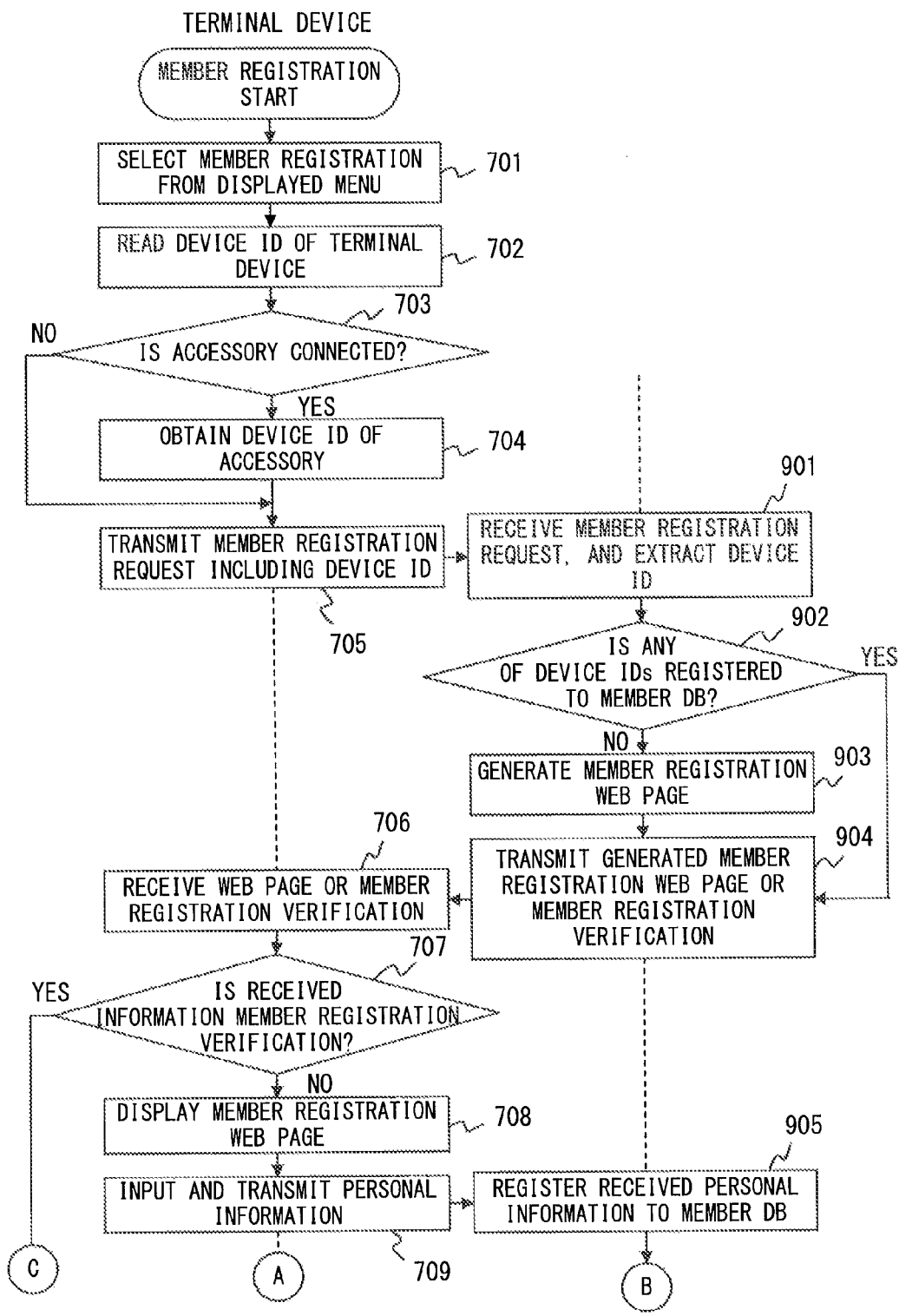
FIG. 15A is a flowchart illustrating one example of a member registration in the information service system according to the embodiment of the present invention.
Figure 15B:
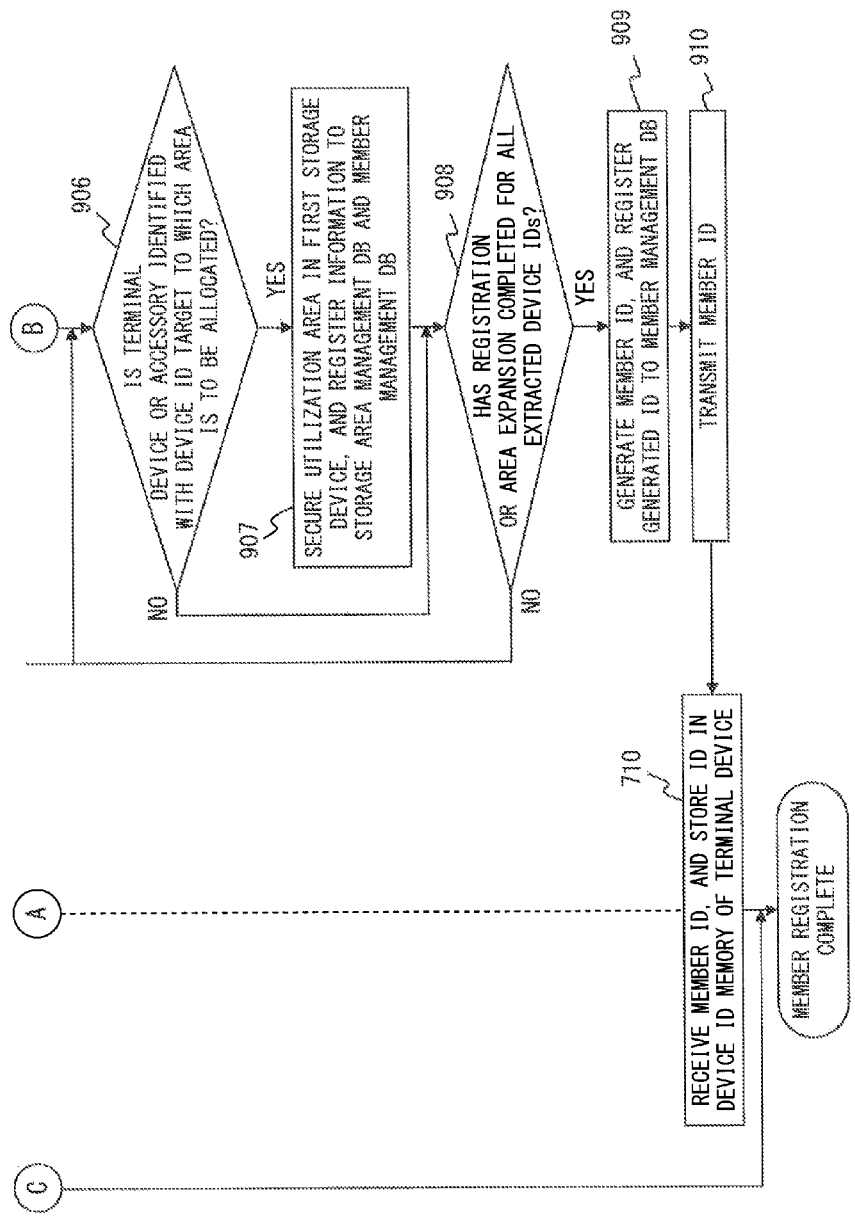
FIG. 15B is the flowchart illustrating one example of the member registration in the information service system according to the embodiment of the present invention.

FIGS. 15A and 15B are a flowchart illustrating one example of a member registration in the information service system according to this embodiment.

FIGS. 15A and 15B depict the example where the terminal device 300 directly makes a member registration to the information storage device 100 via the Internet 30. In this case, a utilization area of a predetermined size available to a member who is registered to the second storage device 102 of the information storage device 100 is set simultaneously with the member registration.

The size of the utilization area allocated to a registered member differs depending on the device type ID or the device ID of the terminal device 300 or the accessory 400 identified by the information service server 103.

Once the member registration is started, the terminal device 300 initially accepts a selection of the member registration from a menu displayed on the display unit 55 (step 701).

Then, the terminal device 300 reads the device type ID 141 and the device ID 142 from the device ID memory 360 (step 702), and determines whether or not the accessory 400 is connected (step 703).

If the accessory 400 is connected, the terminal device 300 obtains the device type ID 141 and the device ID 142 of the accessory 400 (step 704).

Next, the terminal device 300 transmits a member registration request including the device type ID 141 and the device ID 142 of the local terminal device 300 and those of the accessory 400 to the information service server 103 of the information storage device 100 (step 705).

The information service server 103 receives the member registration request from the terminal device 300, and extracts the device type IDs 141 and the device IDs 142 (step 901).

Additionally, the information service server 103 determines whether or not any of the pairs of the extracted device type ID 141 and device ID 142 has been already registered to the member management DB 150 (step 902). If the pairs are not registered, the information service server 103 generates a member registration WEB page (step 903), and transmits the generated member registration WEB page to the terminal device 300 (step 904). Alternatively, if the determination in step 902 results in "YES", the information service server 103 transmits, to the terminal device 300, information (member registration verification) for verifying that the member registration has been already made (step 904).

Upon receipt of the member registration WEB page or the member registration verification (step 706), the terminal device 300 determines whether or not the received data is a member registration verification (step 707). If the received data is not the member registration verification, the terminal device 300 displays the received member registration WEB page (step 708), accepts an input of personal information 152 from the user, and transmits the information to the information service server 103 (step 709). Alternatively, if the determination in step 707 results in "YES", the terminal device 300 displays that the member registration has been already made. Here, the member registration process is completed.

The information service server 103 registers the received personal information to the member management DB 150 (step 905).

Additionally, the information service server 103 determines whether or not the terminal device 300 or the accessory 400 identified with the pair of the device type ID 141 and the device ID 142 is a device to which an area is to be allocated by referencing the device information DB 140 (step 906). If the terminal device 300 or the accessory 400 is a device to which an area is to be allocated, a utilization area of a size identified with the pair of the device type ID 141 and the device ID 142 is secured in the second storage device 102, and information for managing the secured utilization area is registered to the utilization area management DB 160A and the member management DB 150 (step 907).

The processes in the above described steps 906 to 907 are repeated for all pairs of the device type ID 141 and the device ID 142, which are extracted in step 901 (step 908), until registrations or area expansions are completed. If the utilization area has been already secured, it is expanded by the size identified with the pair of the device type ID 141 and the device ID 142, and information registered to the member management DB 150 and the utilization area management DB 160A is updated.

Thereafter, the information service server 103 generates a member ID 151, registers the ID to the member management DB 150 (step 909), and transmits the member ID to the terminal device 300 (step 910).

The terminal device 300 receives the member ID 151 from the information service server 103, and stores the member ID 151 in the device ID memory 360 of the terminal device 300 (step 710). Here, the member registration is completed.

If the terminal device 300 makes a connection to the information service server 103 via the Internet 30 after the member registration, it reads the member ID from the device ID memory 360 along with the device type ID and the device ID, includes the ID in a connection request, and transmits the request to the information service server 103.

In the flow of the member registration illustrated in FIGS. 15A and 15B, the terminal device 300 and the accessory 400 are identified with the pair of the device type ID 141 and the device ID 142. However, if the terminal device 300 and the accessory 400 can be identified with only the device ID 142, they may be identified without using the device type ID 141. In this case, only the device ID and the member ID may be stored in the device ID memory.

Figure 16A:
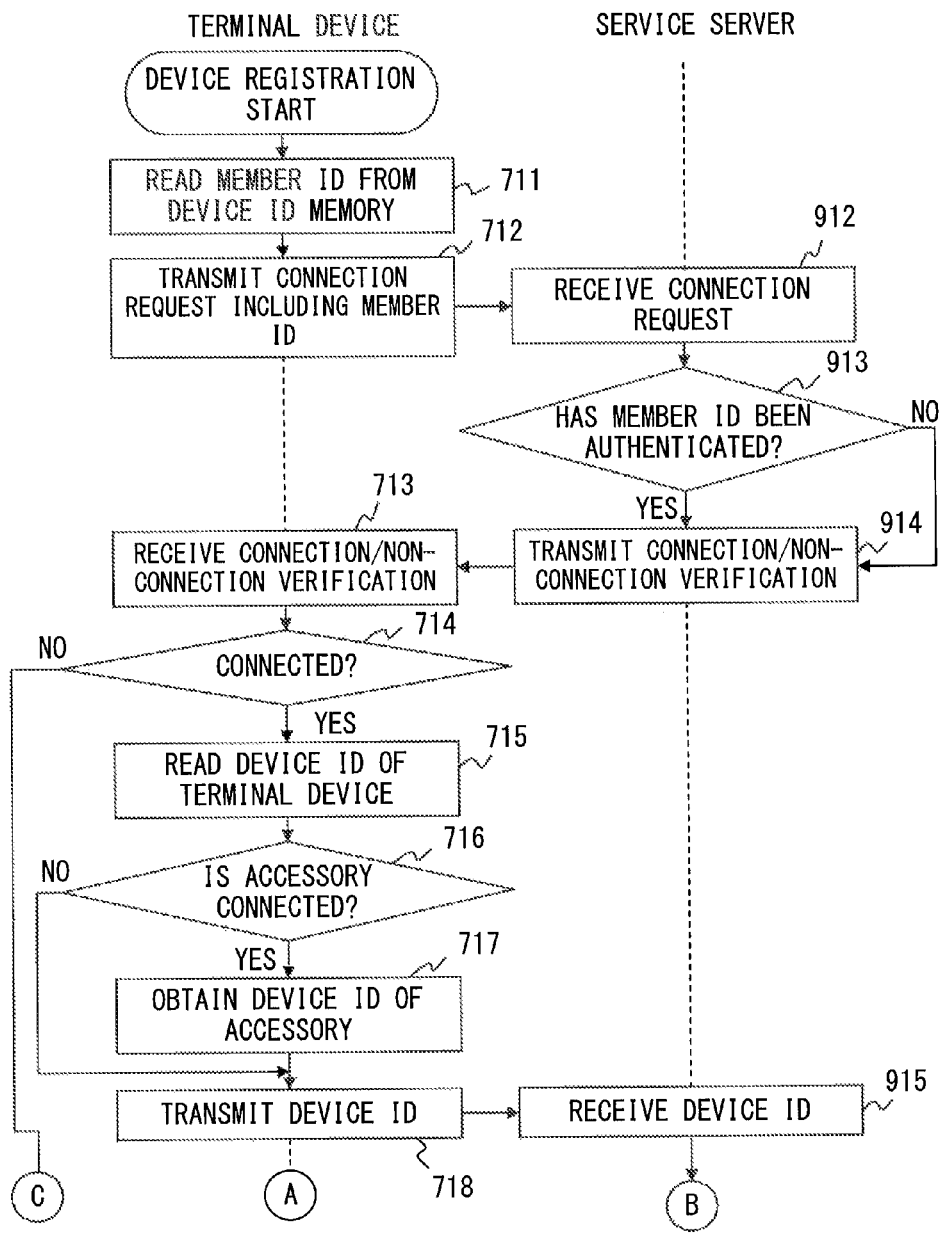
FIG. 16A is a flowchart illustrating one example of a connection process of the terminal device in the information service system according to the embodiment of the present invention.
Figure 16B:
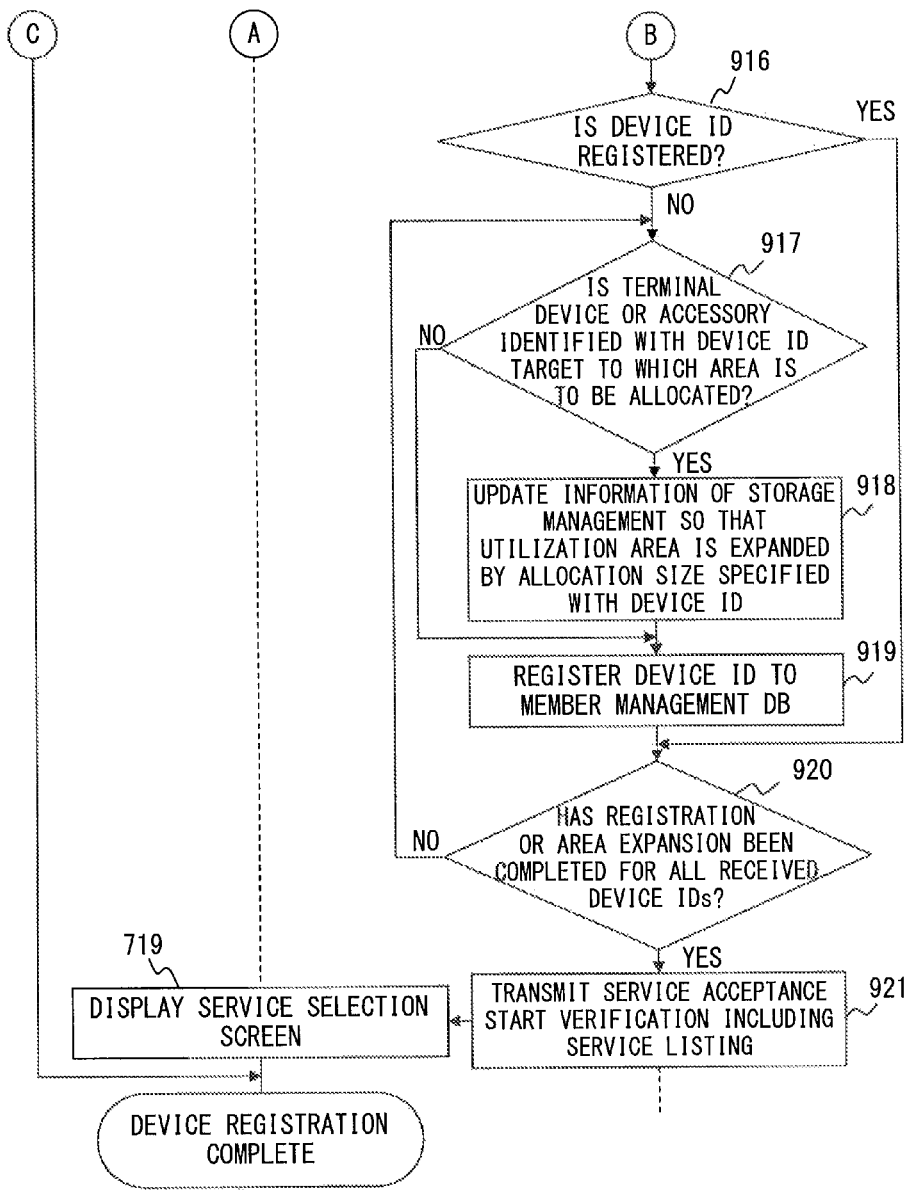
FIG. 16B is the flowchart illustrating one example of the connection process of the terminal device in the information service system according to the embodiment of the present invention.

Additionally, the member registration may be made not by directly connecting the terminal device 300 to the Internet 30 but by using dedicated software that is installed in the network terminal 50 such as a personal computer or the like connected to the Internet 30. In this case, upon activation of the software dedicated to a member registration, whether or not the terminal device 300 is connected to the network terminal 50 is determined, and a device type ID and a device ID are read from the device ID memory of the terminal device 300 if the terminal device 300 is connected. If the accessory 400 is connected to the terminal device 300, a device type ID and a device ID of the accessory 400 are read from the accessory ID memory 450. Then, a member registration request including the device type ID and the device ID is transmitted to the information service server 103 similarly to step 705 of FIG. 15A. Thereafter, the processes in steps 901 to 910 are executed by the information service server 103, and the processes in steps 706 to 710 are executed not by the terminal device 300 but by the network terminal 50. In step 701, the member ID received by the network terminal 50 may be stored in the network terminal 50 in addition to the terminal device 300 and the accessory 400. When the network terminal 50 to which the terminal device 300 is not connected makes a connection to the information service server 103 via the Internet 30 after the member registration, it includes the member ID stored in the local network terminal 50 in a connection request, and transmits the request. In this case, the network terminal 50 does not transmit information corresponding to the device type ID and the device ID. However, the network terminal is authenticated with the member ID when it uses a service rendered by the information service server. Note that the member registration, and a user registration of the terminal device 300 and the accessory 400 are made in a state where the terminal device 300 is connected to the network terminal 50. FIGS. 16A and 16B are a flowchart illustrating one example of the connection process of the terminal device in the information service system according to this embodiment.

The example represented by the flowchart illustrated in FIGS. 16A and 16B refers to a process for examining the terminal device 300 and the accessory 400 when a registered member makes a connection to the information service server 103 with the terminal device 300, for registering a corresponding device as a user (user registration) if any of the devices has not been registered yet, and for increasing a size of a utilization area of the member according to each of the devices registered as the user.

Once the terminal device 300 starts to make a connection to the information service server 103 via the Internet 30, it initially reads the member ID 151 from the device ID memory (step 711), and transmits a connection request including the member ID 151 to the information service server 103 (step 712).

Upon receipt of the connection request (step 912), the information service server 103 determines whether or not the member ID 151 has been authenticated (step 913). The information service server 103 transmits, to the terminal device 300, a connection verification for verifying that a connection is permitted if the member ID 151 has been authenticated, or the information service server 103 transmits a non-connection verification to the terminal device 300 if the member ID 151 has not been authenticated (step 914).

Upon receipt of the connection verification or the non-connection verification (step 713), the terminal device 300 determines whether or not the member ID 151 has been successfully authenticated and the connection has been made (step 714).

If the connection has been successfully made, the terminal device 300 reads the device ID 142 of the local terminal device 300 (step 715). Moreover, if the accessory 400 is connected (step 716), the terminal device 300 obtains the device ID 142 of the accessory 400 (step 717), and transmits the obtained ID to the information service server 103 (step 718). The example of FIGS. 16A and 16B assumes that the terminal device 300 and the accessory 400 can be uniquely identified only with a device ID.

The information service server 103 receives the device ID 142 from the terminal device 300 (step 915).

Then, the information service server 103 determines whether or not the device has been already registered to the member management DB 150 for each received device ID 142 (step 916). If the device has not been registered yet, the information service server 103 further determines whether or not the terminal device 300 or the accessory 400 identified with the device ID 142 is a target to which an area is to be allocated by referencing the device information DB 140 (step 917). If the determination results in "YES", the area size 164 of the utilization area management DB 160A is updated to expand the utilization area of the member identified with the member ID by an allocation size 143 set by the device ID 142 (step 918), and registers the device ID 142 to the member management DB 150 (step 919). If the determination in step 917 results in "NO", the information service server 103 executes step 919.

Alternatively, if the determination in step 916 results in "YES", the device ID has been already registered. Therefore, the flow skips to step 920.

With the processes in steps 917 to 919, the information service server 103 registers all received device IDs 142, and determines whether or not a necessary expansion of a utilization area has been made (step 920). If the expansion of the utilization area has been made, the information service server 103 transmits a service acceptance start verification including a listing of services rendered by the information service server 103 to the terminal device 300 (step 921).

The terminal device 300 that has received the verification displays a service selection screen (step 719). Here, the device registration is completed.

As described above, each time the terminal device 300 directly makes a connection to the information service server 103 via the Internet 30 to use a service, the process illustrated in FIGS. 16A and 16B is executed until the listing of services is displayed. With this process, a purchased device can be registered as a user at an early stage where a member has purchased and started to use the new terminal device 300 or accessory 400, and at the same time, a utilization area of the member can be expanded according to the purchased device.

Figure 17A:
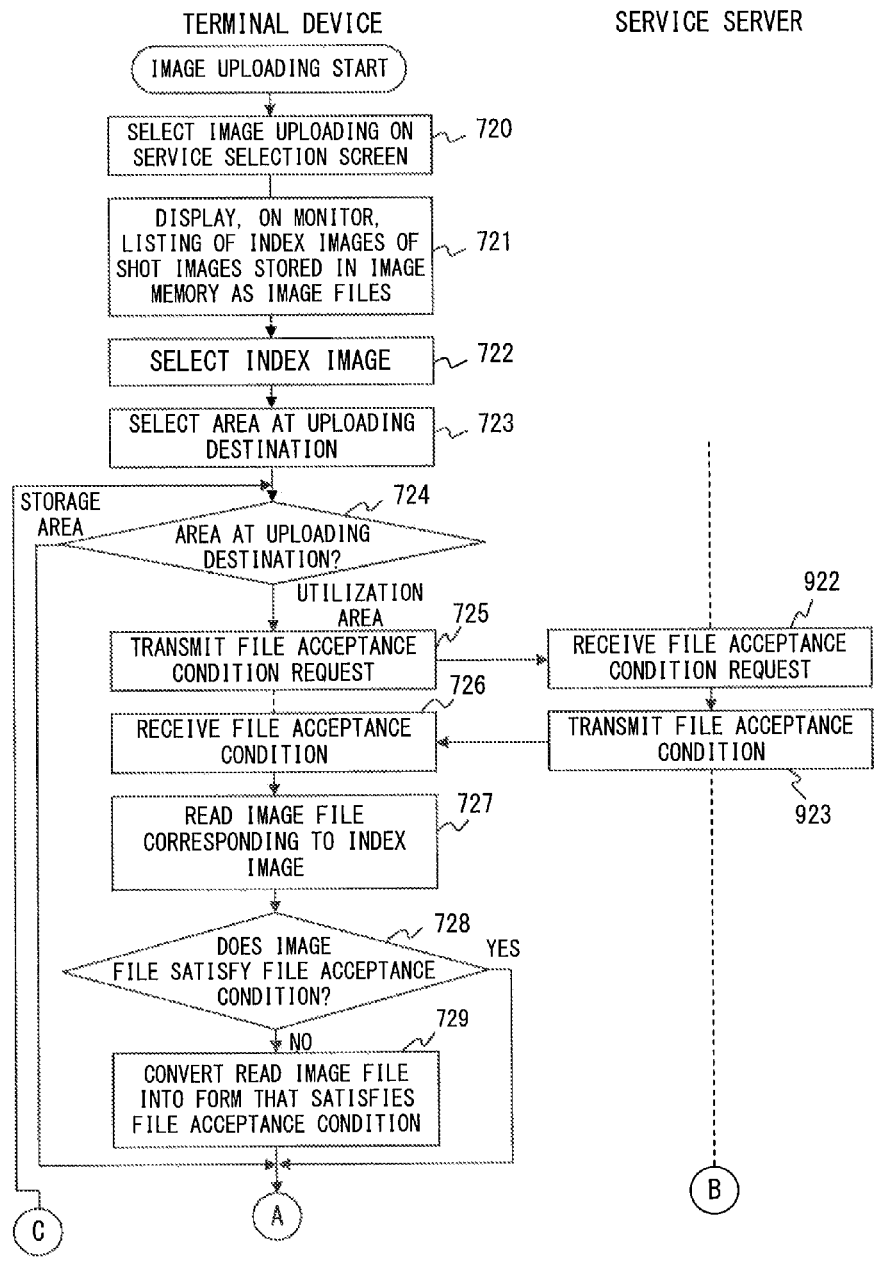
FIG. 17A is a flowchart illustrating one example of a depositing process of an information file in the information storage device in the information service system according to the embodiment of the present invention.
Figure 17B:
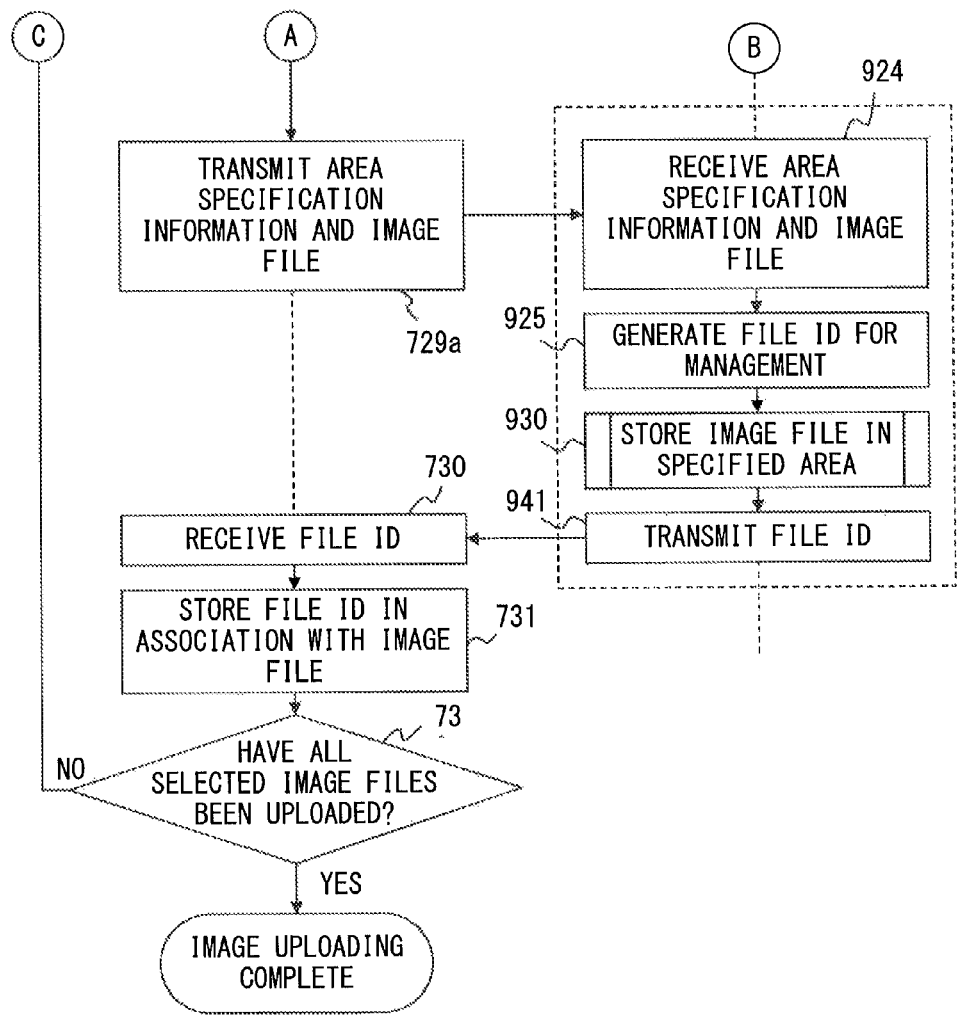
FIG. 17B is the flowchart illustrating one example of the depositing process of the information file in the information storage device in the information service system according to the embodiment of the present invention.

FIGS. 17A and 17B are a flowchart illustrating one example of an information file depositing process in the information storage device in the information service system according to this embodiment.

FIGS. 17A and 17B illustrate a process example where an image file (information file) including an image shot by a camera, which is the terminal device 300, is directly uploaded from the camera into the information service server 103.

In this case, the terminal device 300 obtains a condition for uploading the information file from the information service server 103 into a utilization area, converts the information file on the side of the terminal device 300 so that the condition is satisfied, and stores the file in a form of the information file, which satisfies the condition, in the information storage device 100.

The form of an information file in this embodiment indicates an attribute of information of the information file (a size, a format or the like of a file), and an attribute of information (a type, a compression method or the like of information) included in the information file.

The process example is described by assuming that the member ID authentication and the device registration process, which are described with reference to FIGS. 16A and 16B, have been completed, and the terminal device 300 and the information service server 103 are connected.

When the terminal device 300 displays a service selection screen on the display unit 330 and accepts a selection of uploading the image (step 720), it displays a listing of index images of shot images included in image files stored in the image memory (step 721).

Then, the terminal device 300 accepts a selection of an index image (step 722), and a selection of an area at an uploading destination (step 723).

Next, the terminal device 300 determines whether the area at the uploading destination is either a storage area of the first storage device 101 or a utilization area of the second storage device 102 (step 724).

If the utilization area is selected, the terminal device 300 transmits an information file acceptance condition request to the information service server 103 (step 725).

Upon receipt of the information file acceptance condition request from the terminal device 300 (step 922), the information service server 103 returns an information file acceptance condition (step 923).

The terminal device 300 reads an image file corresponding to the index image (step 727) after it receives the information file acceptance condition from the information service server 103 (step 726).

Then, the terminal device 300 determines whether or not the image file satisfies the information file acceptance condition (step 728). If the image file does not satisfy the information file acceptance condition, the terminal device 300 converts the read image file into a form that satisfies the information file acceptance condition (step 729).

Additionally, if the uploading destination is the storage area in the above described step 724, or if the image file satisfies the acceptance condition in step 728, the terminal device 300 does not convert the file.

Thereafter, the terminal device 300 transmits area specification information and the image file to the information service server 103 (step 729a).

Upon receipt of the area specification information and the image file from the terminal device 300 (step 924), the information service server 103 generates a file ID for management (step 925), and stores the image file in the specified area (step 930).

Thereafter, the information service server 103 transmits the file ID to the terminal device 300 (step 941).

Upon receipt of the file ID (step 730), the terminal device 300 stores the file ID in the image memory 340 in association with the image file (step 731).

After all selected image files have been uploaded with the processes in the above described steps 724 to 731 (step 732), the image uploading is completed. If the determination in step 732 results in "NO", the processes in steps 724 to 731 are repeated for an image file that has been not been updated despite being selected.

Figure 18:
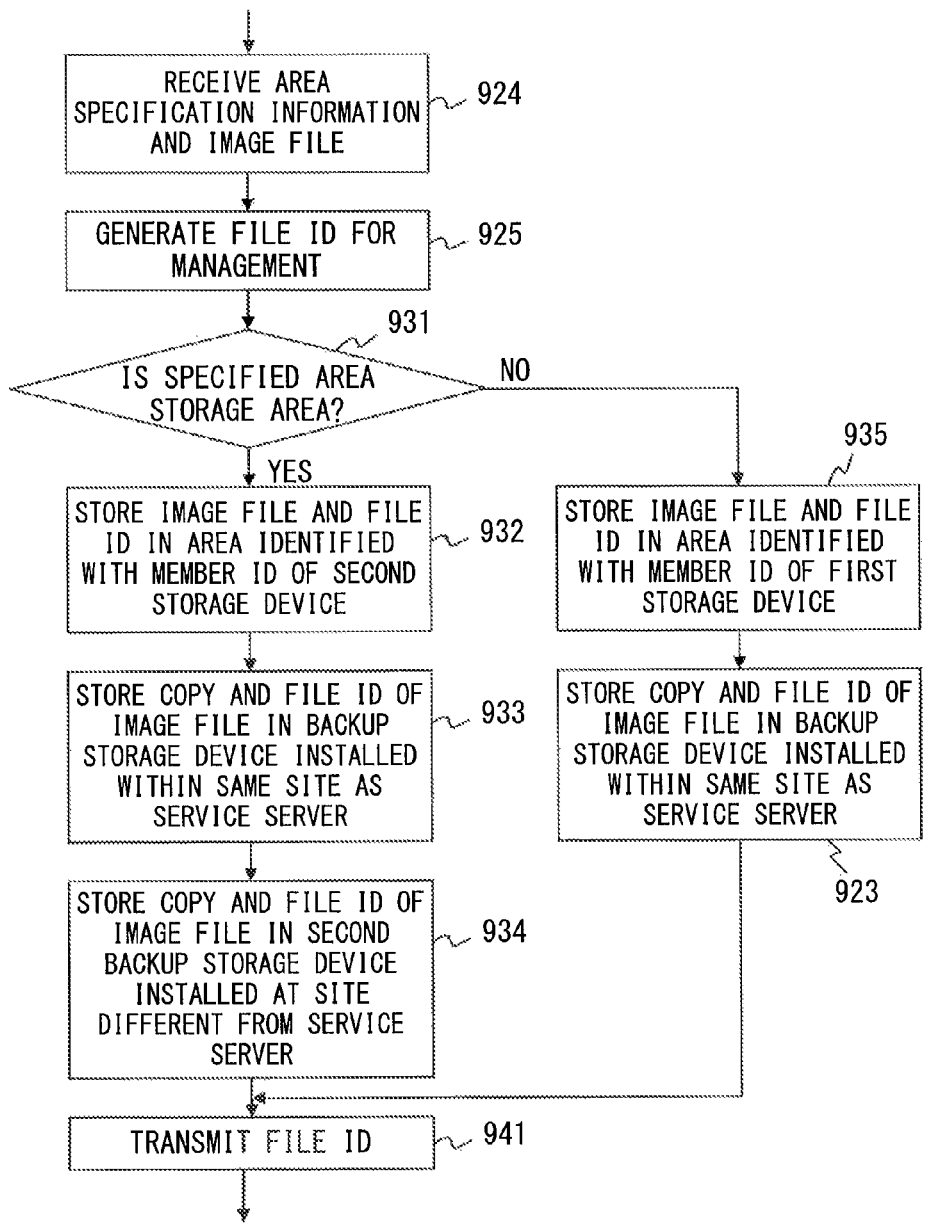
FIG. 18 is a flowchart illustrating further details of a process in step 930 illustrated in FIGS. 17A and 17B.

FIG. 18 is a flowchart illustrating further details of the above described process in step 930 illustrated in FIGS. 17A and 17B. steps corresponding to those of FIGS. 17A and 17B are denoted with the same step numbers.

The process of FIG. 18 is an example of a backup operation corresponding to the above described information service system S1 of FIG. 1.

Namely, this backup operation is an operation performed when the remote backup system 500 is installed geographically remote from the information storage device 100 and the local backup system 200.

After the information service server 103 has received area specification information and an image file (step 924) and generates a file ID for management (step 925), it initially determines whether or not the specified area is a storage area (step 931).

If the specified area is a storage area, the information service server 103 stores the image file and the file ID in an area identified with the member ID 151 of the first storage device 101 (step 932).

Additionally, the information service server 103 stores a copy of the image file and that of the file ID also in the local backup system 200 installed within the same site as the information service server 103 (step 933).

Furthermore, the information service server 103 stores a copy of the image file and that of the file ID in the remote backup system 500 installed at a remote site different from the information service server 103 (step 934).

In contrast, if the information service server 103 determines that the specified area is not a storage area (utilization area) in step 931, it stores the image file and the file ID in an area identified with the member ID 151 in the second storage device 102 (step 935), and further stores a copy of the image file and that of the file ID in the local backup system 200 installed within the same site as the information service server 103 (step 936).

Thereafter, the information service server 103 transmits the file ID to the terminal device 300 (step 941).

In the local backup system, not only copies of information files but those of information of various types of databases of the information service system according to this embodiment are stored. Also a copy of information of the member management DB 150 and that of information of the storage area management DB 160B for managing an information file stored in the first storage device are stored in the remote backup system 500 at predetermined time intervals.

As described above, if a specified destination of an information file is a storage area, a copy of an information file is stored in a local backup server that is installed at a close distance, and also a copy of the information file is stored in a remote backup server installed at a remote distance (for example, in another continent). As a result, the remote backup server is not affected even if a large-scale disaster occurs, and the information file deposited by a member can be safely stored.

Figure 19A:
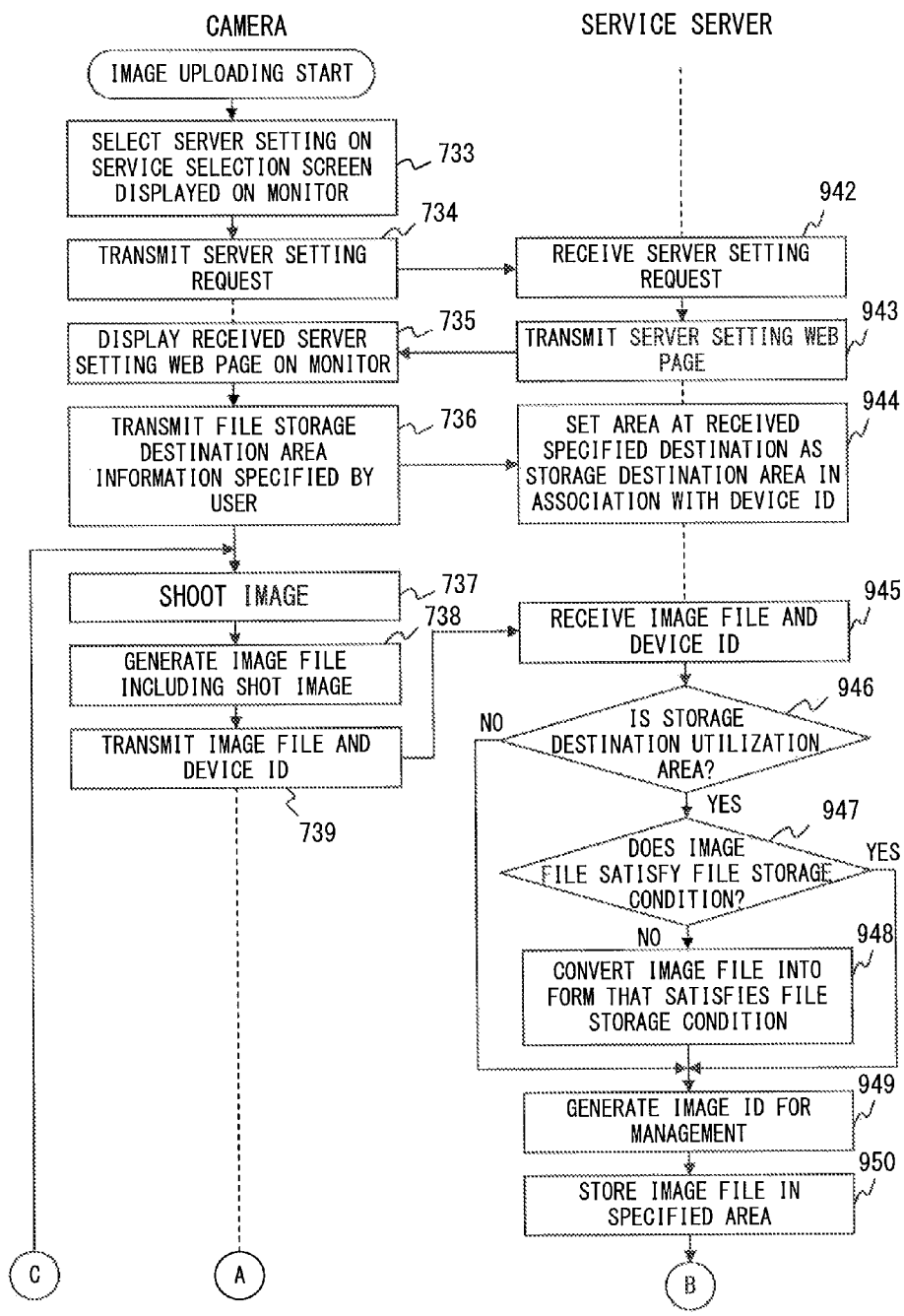
FIG. 19A is a flowchart illustrating a second example of uploading an image shot by a camera directly from the camera into the information service server according to the embodiment of the present invention.
Figure 19B:
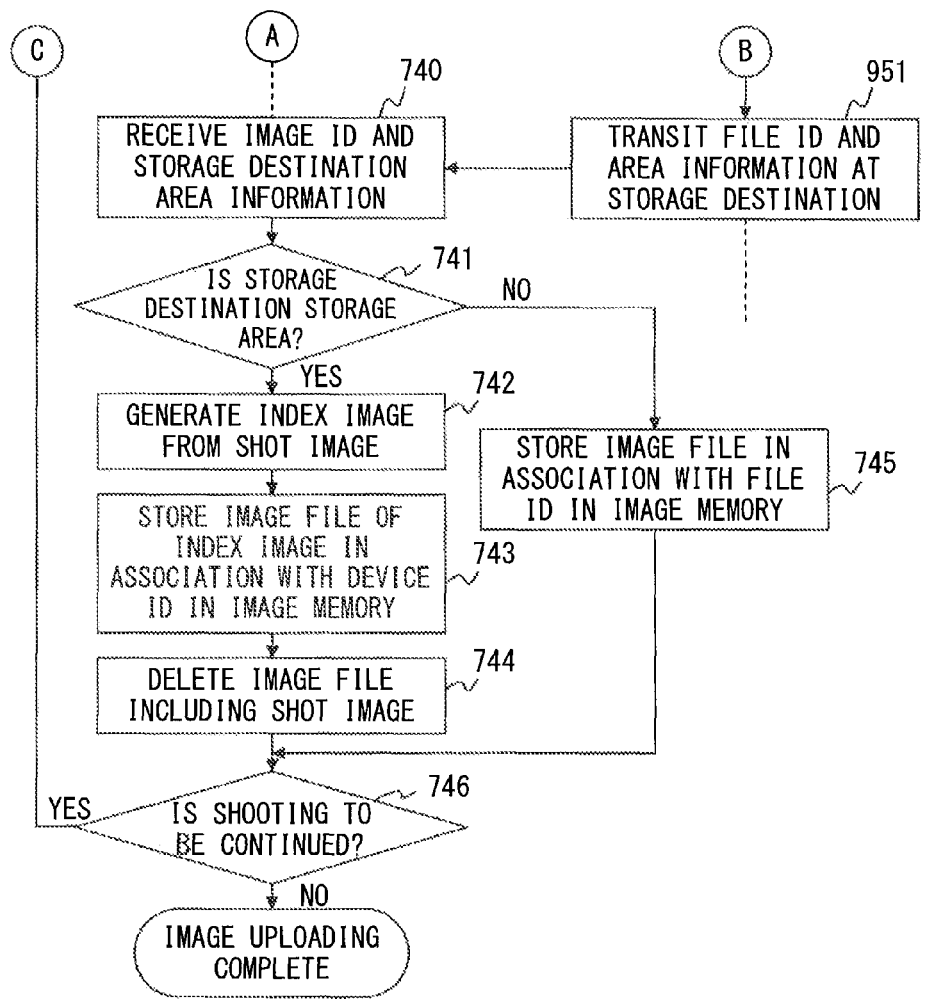
FIG. 19B is the flowchart illustrating the second example of uploading the image shot by the camera directly from the camera into the information service server in the information service system according to the embodiment of the present invention.

FIGS. 19A and 19B are a flowchart illustrating a second example where an image shot by a camera is directly uploaded from the camera to the information service server in the information service system according to this embodiment.

Namely, the example where an information file on the side of the terminal device 300 is deleted in synchronization with the storage of the information file by the terminal device 300 in the information storage device 100 in the information service system according to this embodiment is described.

In this case, a storage destination is set by the information service server 103, the image file of the image shot by the camera is stored in the image memory 340 when the image is shot, and the image file is transmitted to the information service server 103 and stored at a storage destination specified with the setting of the storage destination.

If the storage destination is a utilization area of the second storage device 102, the image file is converted so that a storable file condition is satisfied, and the converted file is stored. If the storage destination is a storage area of the first storage device 101, the image file is stored unchanged. When it is verified on the side of the camera (the terminal device 300) that the image file has been stored in the storage area of the first storage device 101, the shot image within the image memory 340 is deleted, and an index image corresponding to the deleted shot image, and the file ID for identifying the image file stored in the storage area are stored.

After the series of processes in FIGS. 16A and 16B has been terminated, the terminal device 300 displays a service selection screen on the monitor, and accepts a selection of a server setting on the service selection screen (step 733).

When a user selects a server setting, the terminal device 300 transmits a server setting request to the information service server 103 (step 734).

Upon receipt of the server setting request from the terminal device 300 (step 942), the information service server 103 returns a WEB page for the server setting (step 943).

The terminal device 300 displays the server setting WEB page received from the information service server 103 on the monitor, and makes a user select a server (step 735).

Additionally, the terminal device 300 transmits information of a file storage destination area specified by the user to the information service server 103 (step 736).

The information service server 103 registers the received specified destination area as a storage destination area to the member management DB 150 in association with a device ID for identifying the camera (step 944). A character A in the last digit of the device serial number in FIG. 4 represents that the storage destination is a storage area, whereas a character B represents that the storage destination is a utilization area. If the last digit of the device serial number of the terminal device 300 ends with a numeral, it represents that the terminal device 300 identified with the device serial number is not associated with a storage destination. In this case, if the storage destination area is not specified by the terminal device 300 that has transmitted the information file, a WEB page for selecting a storage destination area is transmitted from the information service server 103 to the terminal device 300.

After step 736, the terminal device 300 shoots an image (step 737), generates an image file including the shot image (step 738), stores the image file in the image memory 340, and transmits the image file and a device ID to the information service server 103 (step 739).

Upon receipt of the image file and the device ID (step 945), the information service server 103 determines whether or not the storage destination is a utilization area by referencing the member management DB 150 (step 946).

If the information service server 103 determines that the storage destination is a utilization area, it further determines whether or not the image file satisfies a file storage condition (step 947). If the image file does not satisfy the file storage condition, the information service server 103 converts the image file into a form that satisfies the file storage condition (step 948).

Thereafter, the information service server 103 generates a file ID for management (step 949), stores the converted image file in the specified area (step 950), and transmits the file ID and storage destination area information to the terminal device 300 (step 951). In contrast, if the determination in step 946 results in "NO" and if the determination in step 947 results in "YES", the flow skips to step 949, in which the information service server 103 generates a file ID for management, and stores the image file received in step 950 in the specified area.

Upon receipt of the file ID and the storage destination area information (step 740), the terminal device 300 determines whether or not the storage destination is a storage area (step 741).

If the terminal device 300 determines that the storage destination is a storage area, it generates an index image from the shot image of the image file stored in the image memory 340 (step 742), stores an image file of the index image in the image memory 340 in association with the file ID (step 743), and deletes the image file including the shot image from the image memory 340 (step 744).

If the terminal device 300 determines that the storage destination is not a storage area (utilization are) in step 741, the terminal device 300 stores the image file in the image memory in association with the file ID (step 745).

Thereafter, the terminal device 300 determines whether or not to continue shooting (step 746). If the terminal device 300 determines that the shooting is to be continued, it repeats the above described processes in and after step 737. If the terminal device 300 determines that the shooting is to be terminated, the image uploading is completed.

In the above description, the terminal device 300 is identified with the device ID. However, the terminal device 300 may be identified with a pair of a device type ID and a device ID. In this case, also a device type name is registered to the member management DB 150.

An example where a process for applying a prohibition lock to a deletion operation of an information file uploaded into a storage area (second storage device 102) is added in the process, illustrated in FIGS. 19A and 19B, for uploading an information file from the terminal device 300 into the information service server 103 is described next with reference to FIG. 20.

FIG. 20 is a flowchart illustrating an example of the process for protecting an information file uploaded into a storage area with the process represented by the flowchart illustrated in FIGS. 19A and 19B from a deletion operation in the information service system according to this embodiment.

In FIG. 20, processes common to those of FIGS. 19A and 19B are denoted with the same reference numerals, and redundant descriptions are omitted.

After the terminal device 300 has received a file ID 166 of image data stored in the storage area (the first storage device 101) and area information (storage address 167) of a storage destination from the information service server 103, and has deleted an image file including a corresponding shot image from the image memory 340 (steps 740 to 744), it transmits the file ID 166 and the storage address 167 of the deleted image file to the information service server 103 (step 744a).

Upon receipt of the file ID 166 and the storage address 167 (step 951a), the information service server 103 applies a deletion prohibition lock to the image file by setting a lock flag 166a of the image file corresponding to the file ID 166 in the storage area management DB 160B to "1" (step 951b), and transmits a lock verification to the terminal device 300 (step 951c).

The deletion prohibition applied in step 951b in the information service server 103 means that even a member who possesses an information file cannot delete the information file, for example, with a normal procedure in this embodiment illustrated in FIGS. 23A and 23B to be described later.

Upon receipt of the lock verification of the image file deleted from the image memory 340 in step 744 from the information service server 103 (step 744b), the terminal device 300 determines whether or not to continue the shooting (step 746). If the terminal device 300 determines that the shooting is to be continued, the flow returns to step 737 of FIGS. 19A and 19B.

As described above, in the case of this embodiment, an information file such as an image file or the like that is shot on the side of the terminal device 300 and stored in the first storage device 101, which is the storage area of the information storage device, is locked to be not deleted with the normal procedure at timing when the information file is deleted on the side of the terminal device 300. As a result, the information file of a user, which is stored in the first storage device 101, can be more securely protected.

In the information service system according to this embodiment, an information file safely stored in the first storage device 101 of the information storage device 100 cannot be directly used for a service rendered by the information service server 103. To use the information file safely stored in the first storage device 101 for the service rendered by the information service server 103, the information file stored in the first storage device 101 needs to be copied to the second storage device 102.

Figure 21:
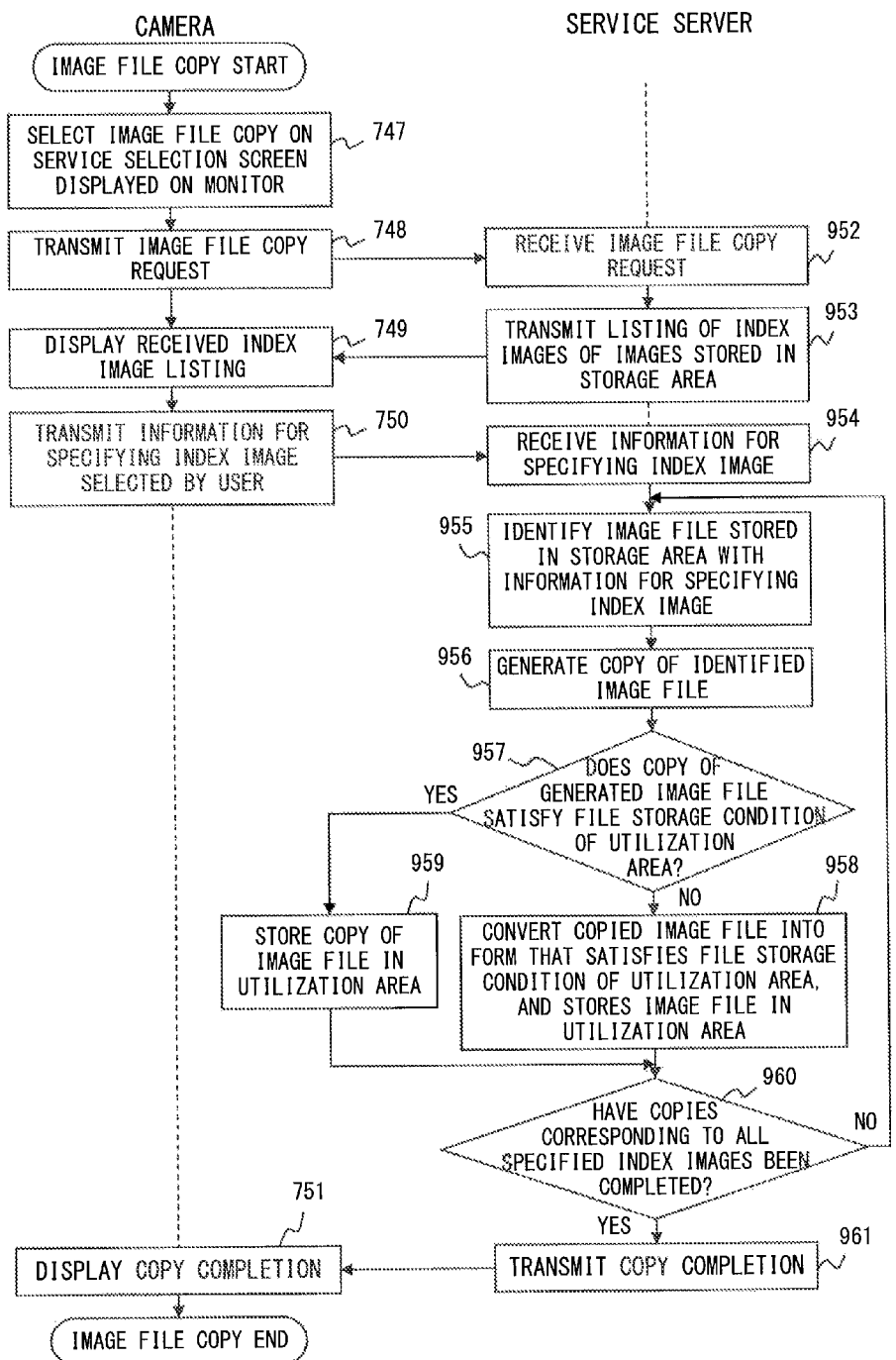
FIG. 21 is a flowchart illustrating a process for copying an information file safely stored in a second storage device of the information storage device to a first storage device in the information service system according to the embodiment of the present invention.

FIG. 21 is a flowchart illustrating one example of the process for copying an information file stored in the first storage device 101 to the second storage device 102 by operating the terminal device 300.

If an image file is copied from the first storage device 101 to the second storage device 102 in the information storage device 100, the terminal device 300 transmits an image file copy request to the information service server 103 (step 748) upon acceptance of an image file copy service selected by a user (step 747) on a service selection screen displayed on the display unit 330 after the series of processes illustrated in FIGS. 16A to 16B has been terminated.

Upon receipt of the image file copy request, the information service server 103 transmits a listing of index images of images included in image files stored in the storage area (the first storage device 101) to the terminal device 300 (step 953).

The terminal device 300 displays the received listing of index images on the display unit 330, makes a user select any of the index images (step 749), and transmits information for specifying the index image selected by the user to the information service server 103 (step 750).

Upon receipt of the information for specifying the index image (step 954), the information service server 103 identifies the image file stored in the storage area with the information for specifying the index image (step 955), and makes a copy of the identified image file (step 956).

Next, the information service server 103 determines whether or not the generated copy of the image file satisfies a file storage condition of a utilization area (the first storage device 101) (step 957).

If the copy does not satisfy the condition, the information service server 103 converts the copied image file into a form that satisfies the file storage condition of the utilization area, and stores the image file in the utilization area (step 958). If the copy satisfies the condition, the information service server 103 stores the copy of the image file in the utilization area unchanged (step 959).

Upon completion of copying image files corresponding all specified index images (step 960), the information service server 103 transmits a copy completion to the terminal device 300 (step 961).

The terminal device 300 that has received the copy completion displays that the image files have been copied (step 751), and terminates the copies of the image files.

One example of a method for sharing an information file among members of an information sharing group that can include a non-member in addition to members registered to the information service system according to this embodiment is described next with reference to FIGS. 22A and 23B.

Figure 22A:
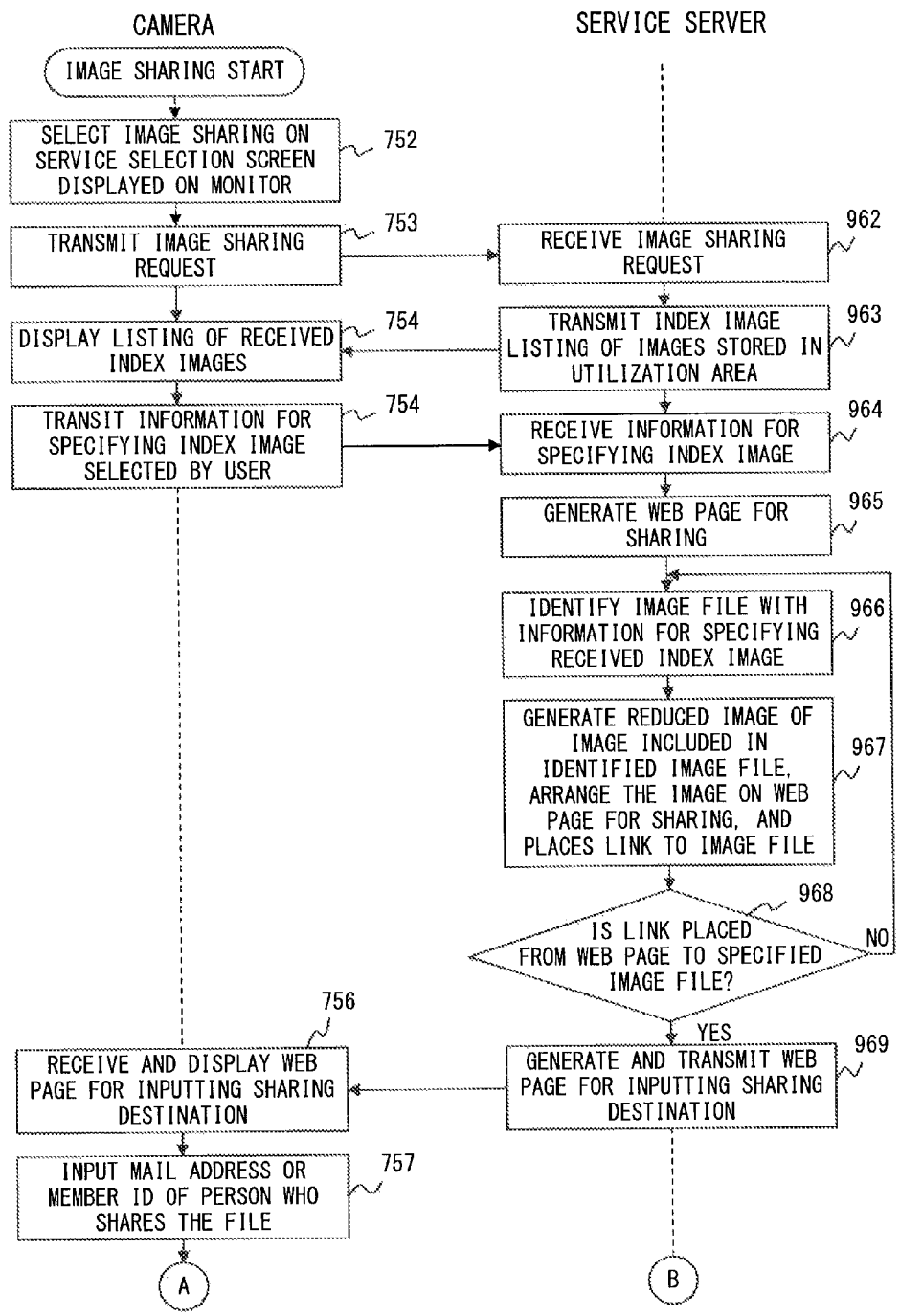
FIG. 22A is a flowchart illustrating one example of a method for sharing an information file among users in the information service system according to the embodiment of the present invention.
Figure 22B:
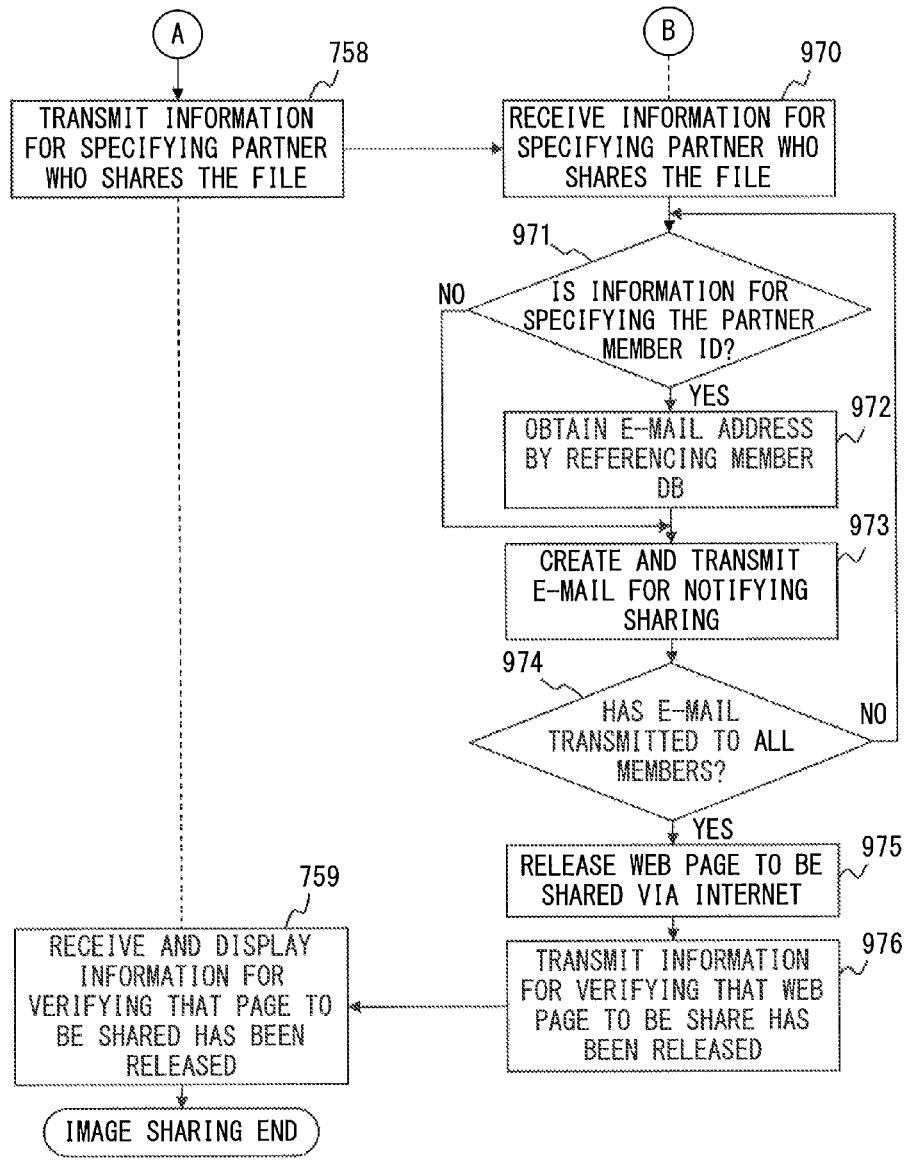
FIG. 22B is the flowchart illustrating one example of the method for sharing the information file among the users in the information service system according to the embodiment of the present invention.

FIGS. 22A and 22B are a flowchart illustrating one example of a process for sharing an information file among members of an information sharing group in the information service system according to this embodiment.

After the series of processes illustrated in FIGS. 16A and 16B has been terminated, the terminal device 300 initially accepts a selection of image sharing on the service selection screen displayed on the monitor (the display unit 330) (step 752), and transmits an image sharing request to the information service server 103 (step 753).

Upon receipt of the image sharing request (step 962), the information service server 103 transmits, to the terminal device 300, a listing of index images of images included in image files stored in a utilization area (the second storage device 102) (step 963).

The terminal device 300 makes a user select an index image by displaying the received listing of index images on the display unit 330 (step 754), and transmits information for specifying the index image selected by the user to the information service server 103 (step 755).

Upon receipt of the information for specifying the index image (step 964), the information service server 103 generates a WEB page for sharing (step 965).

Thereafter, the information service server 103 identifies the image file to be shared based on the received information for specifying the index image (step 966), generates a reduced image of the image included in the identified image file, arranges the generated image on the WEB page for sharing, and places a link from the reduced image to the image file (step 967).

Then, the information service server 103 verifies whether or not links have been placed from reduced images arranged on the WEB page to all specified image files (step 968), and repeats steps 966 and 967 until links have been placed to all the specified image files. Upon completion of placing the links to all the specified image files, the information service server 103 generates a WEB page for inputting a member of the information sharing group, and transmits the WEB page to the terminal device 300 (step 969).

The terminal device 300 receives the WEB page for inputting a member of the information sharing group, displays the WEB page on the display unit 330 (step 756), and accepts an input of an e-mail address or a member ID 151 of a member of the information sharing group (step 757).

The terminal device 300 transmits information (member ID 151 and e-mail address) for specifying the input information sharing group member to the information service server 103 (step 758).

Upon receipt of the information for specifying the information sharing group member from the terminal device 300 (step 970), the information service server 103 determines whether or not the information for specifying the member is a member ID 151 (step 971). If the information for specifying the member is the member ID 151, the information service server 103 obtains an e-mail address by referencing the member management DB 150 (step 972), creates e-mail for notifying the member of the sharing, and transmits the e-mail to the member of the information sharing group (step 973). Alternatively, if the determination in step 971 results in "NO", namely, if the information for specifying the member is an e-mail address, the information service server 103 creates e-mail for notifying the member of the sharing after it registers the e-mail address to the sharing management DB 170, and transmits the e-mail to the member of the information sharing group (step 973).

The processes in steps 971 to 973 are repeated for all the members of the information sharing group specified by the information received from the terminal device 300 (step 974).

Thereafter, the information service server 103 releases the WEB page for sharing via the Internet 30 (step 975), and transmits, to the terminal device 300, information for verifying that the WEB page for sharing has been released (step 976).

The terminal device 300 receives the information for verifying that the WEB page for sharing has been released from the information service server 103, and displays the WEB page on the display unit 330 (step 759). Here, the information file sharing process is completed.

One example of an operation for deleting an information file stored in the information storage device 100 by the terminal device 300 in the information service system according to this embodiment is described next.

Figure 23A:
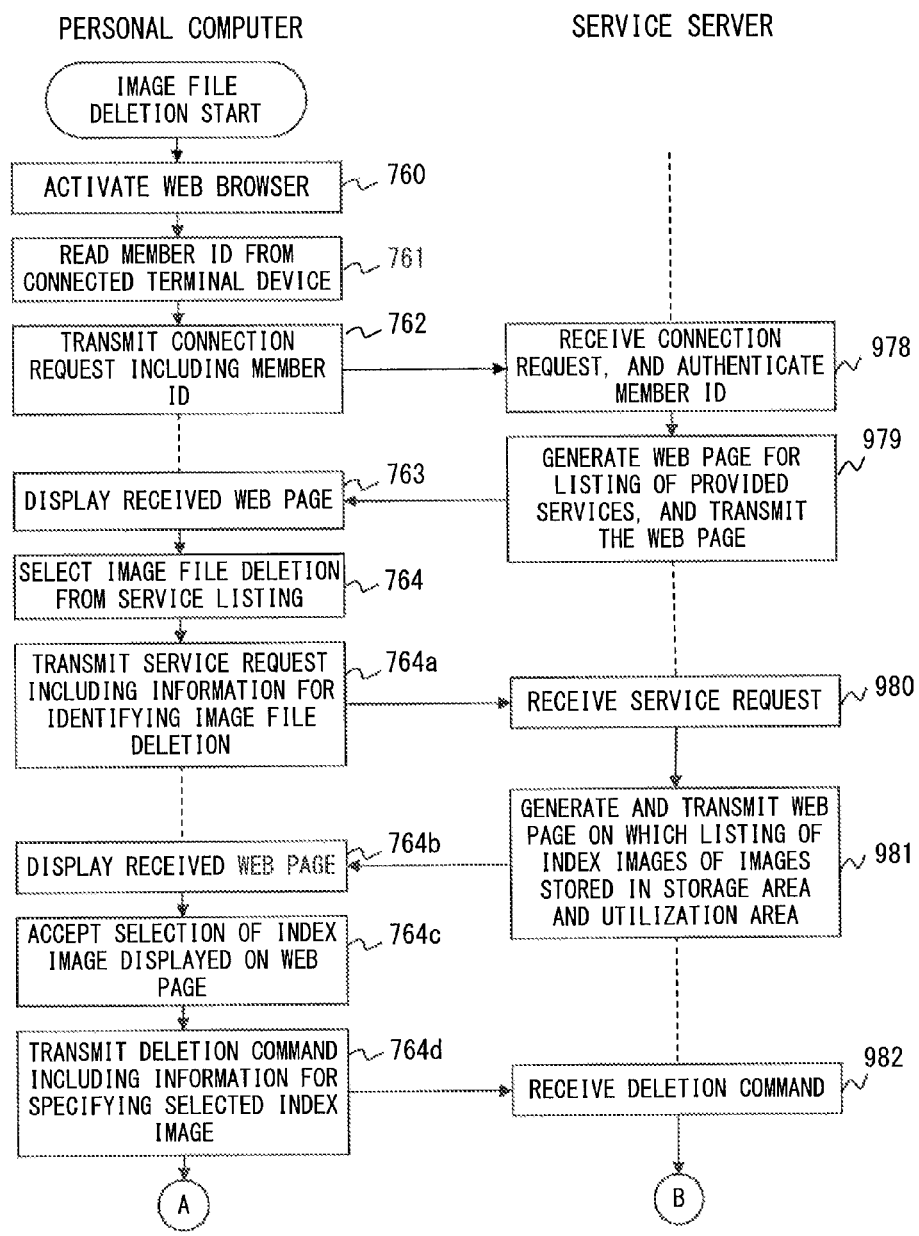
FIG. 23A is a flowchart illustrating one example of a deletion operation of an information file of the information storage device in the information storage device and the information service system according to the embodiment of the present invention.
Figure 23B:
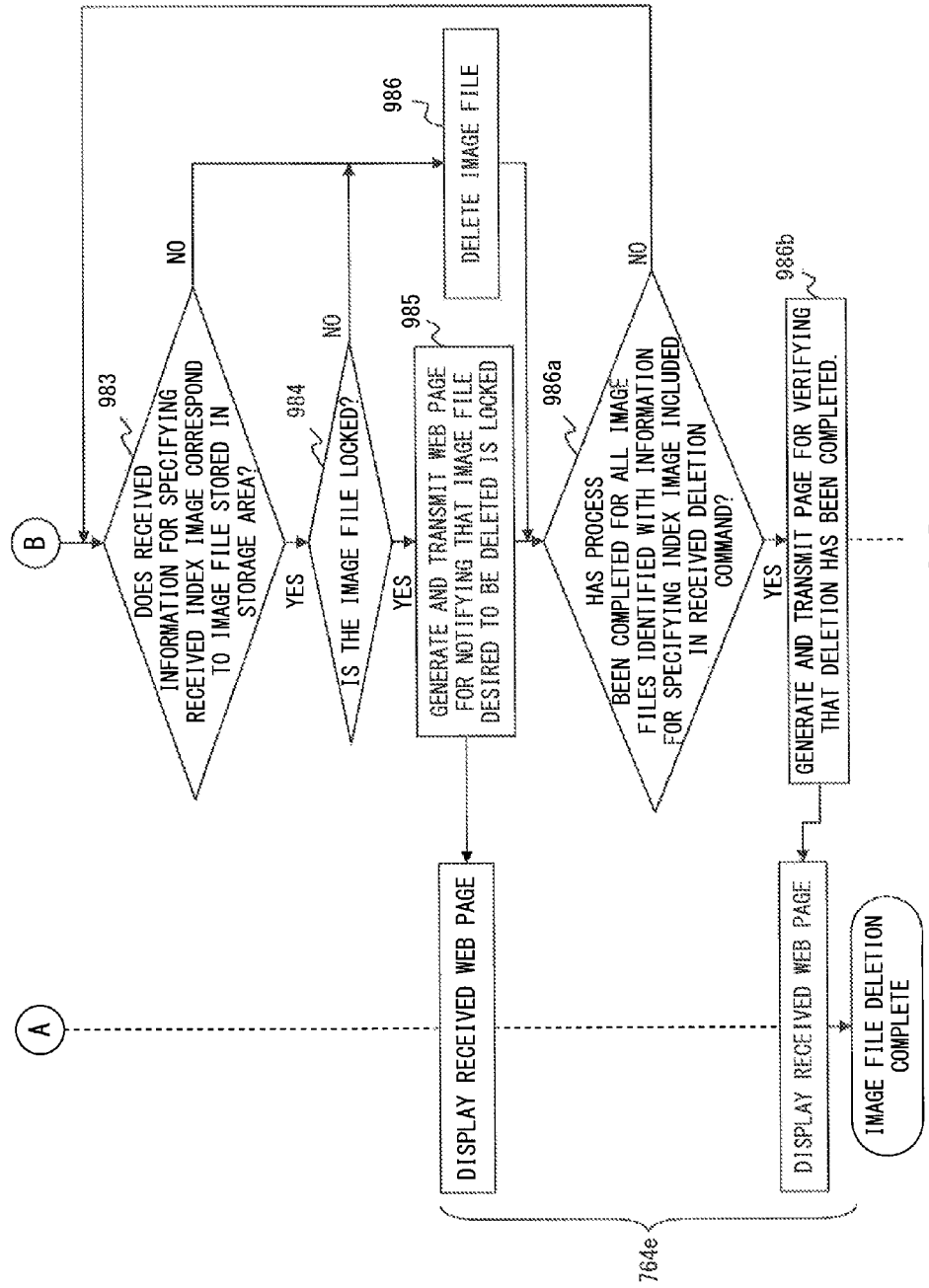
FIG. 23B is the flowchart illustrating one example of the deletion operation of the information file of the information storage device in the information storage device and the information service system according to the embodiment of the present invention.

FIGS. 23A and 23B are a flowchart illustrating one example of a process for deleting an information file stored in the first storage device 101 and the second storage device of the information storage device 100 in the information storage device and the information service system according to this embodiment by operating a personal computer (the network terminal 50) to which a camera (the terminal device 300) is connected.

The network terminal 50 activates a WEB browser when an image file (information file) starts to be deleted (step 760), reads a member ID 151 from the terminal device 300 connected to the network terminal 50 (step 761), and transmits a connection request including the read member ID 151 to the information service server 103 (step 762).

The information service server 103 generates a WEB page for displaying a listing of services rendered by the information service server 103, and transmits the listing to the network terminal 50 (step 979) after it has received the connection request and authenticated the member ID 151 (step 978).

The network terminal 50 displays the WEB page received from the information service server 103 on the display unit 330 (step 763), detects that an image file deletion has been selected by a user on the WEB page (step 764), and transmits a service request command including information for specifying the image file deletion to the information service server 103 (step 764*a*).

The information service server 103 receives the service request command including the information for specifying the image file deletion (step 980), generates a deletion target listing WEB page on which a listing of index images of images included in image files stored in the storage area (the first storage device 101) and the utilization area (the second storage device 102) are displayed, and transmits the WEB page to the network terminal 50 (step 981).

The network terminal 50 displays the deletion target listing WEB page received from the information service server 103 on the display unit 330 (step 764*b*), and accepts a selection of an index image displayed on the WEB page by the user (step 764*c*).

Then, the network terminal 50 transmits a deletion command including information for specifying the index image selected by the user to the information service server 103 (step 764*d*).

Upon receipt of the deletion command from the network terminal 50 (step 982), the information service server 103 determines whether or not the received information for specifying the index image corresponds to an image file stored in the storage area (step 983). If the information corresponds to the image file stored in the storage area, the information service server 103 further determines whether or not the image file is locked (namely, whether or not the lock flag 166*a* is set) (step 984).

If the image file is locked, the information service server 103 generates a WEB page for notifying that the image file desired to be deleted is locked, and transmits the WEB page to the network terminal 50 (step 985).

Alternatively, if the information service server 103 determines that the information does not correspond to the image file stored in the storage area in step 983, or if the information service server 103 determines that the file is not locked in step 984, it deletes the image file specified by the network terminal 50 (step 986).

Then, the information service server 103 determines whether or not the processes in steps 983 to 986 have been completed for all image files identified with the information for specifying an index image, which is included in the deletion command received from the network terminal 50 (step 986*a*).

If the processes have not been completed, the information service server 103 repeats the processes in steps 983 to 986*a*. If the processes have been completed, the information service server 103 generates a WEB page for verifying that the image files have been deleted, and transmits the WEB page to the network terminal 50 (step 986*b*).

The network terminal 50 displays the WEB page received from the information service server 103 in the above described step 985 or 986*b* (step 764*e*). Here, the deletions of the image files are completed.

As described above, in this embodiment, if the lock flag 166*a* is set for an information file such as an image file stored in the storage area (the first storage device 101), even a person who possesses the information file cannot delete the file. Therefore, the information file is securely protected.

One example of a process for downloading an information file stored in the information storage device 100 into the terminal device 300 of a user is described next.

Figure 24:
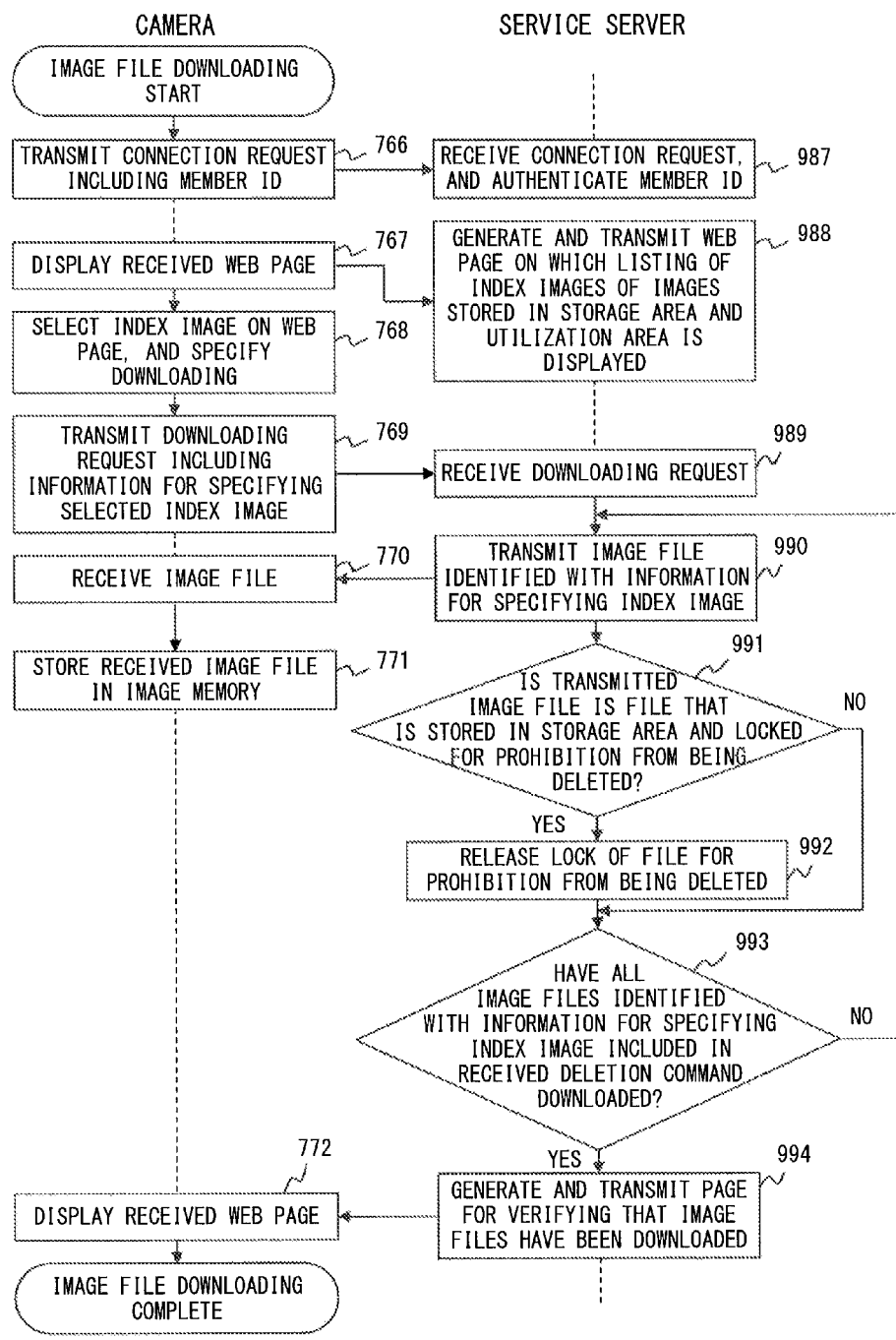
FIG. 24 is a flowchart illustrating one example of downloading an information file from the information storage device into the terminal device in the information service system according to the embodiment of the present invention.

FIG. 24 is a flowchart illustrating one example of downloading an image file from the information storage device in the information service system according to this embodiment into a camera as the terminal device 300.

When the image file starts to be downloaded, the terminal device 300 transmits a connection request including a member ID 151 to the information service server 103 of the information storage device 100 (step 766).

After the information service server 103 has received the connection request and authenticated the member ID 151 (step 987), it generates a WEB page on which a listing of index images of image files stored in the storage area (the first storage device 101) and a utilization area (the second storage device 102) is displayed, and transmits the WEB page to the terminal device 300 (step 988).

The terminal device 300 displays the WEB page received from the information service server 103 on the display unit 330 (step 767), makes a user select an index image on the WEB page, and accepts downloading of a selected index image (step 768).

The terminal device 300 transmits a downloading request including information for specifying the selected index image to the information service server 103 (step 769).

Upon receipt of the downloading request from the terminal device 300 (step 989), the information service server 103 transmits an image file identified with the information for specifying the index image to the terminal device 300 (step 990).

Thereafter, the information service server 103 determines whether or not the image file transmitted to the terminal device 300 in step 990 is a file that is stored in the storage area (the first storage device 101) and locked to be prohibited from being deleted (step 991).

If the image file is a locked file, the information service server 103 sets the lock flag 166*a* to "0", and releases the lock of the file prohibited from being deleted (step 992).

Thereafter, the information service server 103 determines whether or not all image files specified by the deletion request received from the terminal device 300 have been downloaded (step 993), and repeats steps 990 to 992 until all the image files have been downloaded.

If the information service server 103 determines that all the specified files have been downloaded in step 993, it generates a page for verifying that the image files have been downloaded, and transmits the page to the terminal device 300 (step 994).

The terminal device 300 receives the image file from the information service server 103 in the above described step 990 (step 770), and stores the received image file in the image memory (step 771).

Additionally, the terminal device 300 receives the WEB page transmitted from the information service server 103 in step 994, and displays the WEB page on the display unit 330 (step 772). Here, the downloading of the image files is completed.

As described above, in the case of this embodiment, the information service server 103 of the information storage device 100 enables an information file such as an image file or the like stored in the storage area (the first storage device 101) to be deleted by releasing the lock flag 166a after the information file has been downloaded into the terminal device 300. Therefore, even if the information file on the side of the information storage device 100 is deleted, a copy of the deleted information file is present on the side of the terminal device 300. Therefore, the information file can be securely prevented from being lost, for example, with an erroneous deletion operation or the like.

Namely, the reliability of storage of an information file in the terminal device 300 is improved.

FIG. 25 is a conceptual schematic illustrating a configuration example of an information storage device and an information service system according to another embodiment of the present invention.

In the information service system S2 illustrated in FIG. 25, an information storage device 100A and a local backup system 200A are connected to the Internet 30 via a gateway 20A and a LAN 10A in addition to the information storage device 100 and the local backup system 200, which are connected to the Internet 30 via the gateway 20 and the LAN 10.

In the case of this embodiment illustrated in FIG. 25, the information storage device 100 and the local backup system 200, and the information storage device 100A and the local backup system 200A are systems having an equivalent configuration, and installed in mutually different countries or regions that are geographically remote.

The information storage device 100A, the local backup system 200A, the gateway 20A, and the LAN 10A respectively have configurations equivalent to the information storage device 100, the local backup system 200, the gateway 20, and the LAN 10.

In the case of the embodiment illustrated in FIG. 25, the local backup system 200 of the information storage device 100 includes both the above described file backup management DB 240 and database backup management DB 250, and also functions as a remote backup system 500 on the side of the information storage device 100A.

Similarly, the local backup system 200A of the information storage device 100A includes both the above described file backup management DB 240 and database backup management DB 250, and also functions as a remote backup system 500 of the information storage device 100.

Namely, in the case of this embodiment illustrated in FIG. 25, the local backup system 200 and the local backup system 200A are configured to serve also as the remote backup system 500 in the information storage device 100A and the information storage device 100. Therefore, the remote backup system 500 is omitted, whereby the information service system S2 can be efficiently operated.

In the case of this embodiment illustrated in FIG. 25, a user selects and registers which of the information storage device 100 and the information storage device 100A to use at the member registration that is represented by the flowchart illustrated in FIGS. 15A and 15B and made with the network terminal 50 or the terminal device 300.

Accordingly, the network terminal 50 and the terminal device 300 according to this embodiment are provided with a function of making a user select either of the information storage device 100 and the information storage device 100A.

This embodiment illustrated in FIG. 25 has an advantage such that the reliability of storage of an information file in the storage area (the second storage device 102) of the information storage device 100 can be improved at low cost by configuring the local backup system 200 and the local backup system 200A to mutually serve also as another remote backup system 500 when pluralities of information storage devices 100 and information storage devices 100A are installed in different countries or regions at remote sites.

INDUSTRIAL APPLICABILITY

The embodiments of the present invention can provide a technique of safely storing an information file of original image data or the like deposited from a user, and of making diverse services using an information file easily available.

The present invention is not limited to the configurations referred to in the above described embodiments, and can be diversely modified within a scope that does not depart from the gist of the invention as a matter of course.

What is claimed is:

1. An information storage device for storing an information file of a registered member, comprising:
    a first storage unit configured to store an arbitrary information file transmitted from the registered member via a wide area information network, and to prohibit the stored information file from being edited by the member and from being shared with a third party who is not the member;
    a second storage unit configured to store an information file in a predetermined form, which is derived from the information file stored in the first storage unit, to enable the stored information file to be edited by the member, and to allow the stored information file to be shared with the third party who is not the member;
    an information file determination unit configured to determine whether or not the information file stored in the first storage unit is the information file in the predetermined form;
    a file conversion unit configured to convert an information file into the information file in the predetermined form; and
    a storage management unit configured to manage the information file stored in the first storage unit, and the information file stored in the second storage unit, wherein
    if the information file determination unit determines that a copy of the information file stored in the first storage unit is not in the predetermined form when the copy is stored in the second storage unit, the storage management unit converts the copy into the information file in the predetermined form with the file conversion unit, and stores the copy in the second storage unit.

2. The information storage device according to claim 1, wherein the storage management unit stores the information file in the predetermined form, which is transmitted from the member via the wide area information network, in the second storage unit, and converts the information file into the predetermined form with the file conversion unit and stores the information file in the second storage unit if the information file transmitted from the registered member via the wide area information network is in a form different from the predetermined form.

3. The information storage device according to claim 2, further comprising:
a member database configured to store information about the member; and
a member management unit configured to register member identification information for identifying the member to the member database by a member registration request received via the wide area information network, and to set a second storage area available to the member whose member identification information is registered to the member database in the second storage unit, wherein
the member management unit comprises
a first storage setting unit configured to set a first storage area used by the member identified with the member identification information included in a storage area purchase request received via the wide area information network to be available in the first storage unit for a predetermined duration by a capacity specified by the storage area purchase request, and
a charging management unit configured to charge a cost needed to set the first storage area to the member identified with the member identification information included in the storage area purchase request.

4. The information storage device according to claim 3, wherein
the member management unit comprises a device information registration unit configured to register device identification information for identifying an external device included in a device registration request received via the wide area information network, or a second external device connected to the external device in association with the member identification information included in the device registration request, and
the member management unit adds a storage space of a size according to the device identification information registered by the device information registration unit to the second storage area that is allocated to a member identified with the member identification information.

5. The information storage device according to claim 4, wherein
the member management unit causes the first storage setting unit to extract a third storage area that reaches an expiry date within the first storage area included in the first storage unit, and to set the expiry date of the third storage area to extend by a predetermined duration, and
the member management unit causes the charging management unit to charge a cost needed to extend the expiry date by the predetermined duration to the member using the third storage area.

6. The information storage device according to claim 5, wherein
the storage management unit stores a copy of the information file stored in the second storage unit in a backup storage device connected to the information storage device via a local area network (LAN), also stores a copy of the information file stored in the first storage unit in the backup storage device, and further stores a copy in a remote backup storage device that is installed geographically remote from the backup storage device.

7. The information storage device according to claim 6, wherein
the storage management unit stores the copy of the information file stored in the second storage unit in the backup storage device via a local area information network, stores the copy of the information file stored in the first storage unit in the backup storage device via the local area information network, and stores the copy in the remote backup storage device via the wide area information network.

8. The information storage device according to claim 5, further comprising
an external device identification unit configured to identify the external device that has transmitted the information file received via the wide area information network, wherein
the storage management unit stores the information file included in an information file storage request received via the wide area information network in the first storage area or the second storage area according to storage destination information preset for the external device that has transmitted the storage request and is identified by the external device identification unit.

9. The information storage device according to claim 5, wherein
the information file determination unit determines at least one of a size of a third information file to be stored in the second storage unit, and a type and a file format of information included in the information file, and determines that at least one of a still image file, a moving image file, and a voiced file as the information file in the predetermined form.

10. An information service system where an information storage device and an external device operated by a registered member are connected to a wide area information network, wherein:
the information storage device comprises
a first storage unit configured to store an arbitrary information file transmitted from the external device via a wide area information network, and to prohibit the stored information file from being edited by the member and from being shared with a third party who is not the member,
a second storage unit configured to store an information file in a predetermined form, which is derived from the information file stored in the first storage unit, to enable the stored information file to be edited by the member and to allow the stored information file to be shared with the third party who is not the member,
an information file determination unit configured to determine whether or not the information file stored in the first storage unit is the information file in the predetermined form,
a file conversion unit configured to convert the information file into the information file in the predetermined form, and
a storage management unit configured to manage the information file stored in the first storage unit, and the information file stored in the second storage unit;
the external device comprises
a storage medium for storing the information file,
an information file selection unit configured to select the information file stored on the storage medium, and
an information file transmission unit configured to transmit the information file selected by the information file selection unit to the information storage device via the wide area information network; and if the information file determination unit determines that a copy of the information file stored in the first storage unit is not in the predetermined form when the copy is stored in the second storage unit, the storage management unit converts the copy into the information file in the predetermined form with the file conversion unit, and stores the information file in the second storage unit.

11. The information service system according to claim 10, wherein:

the external device further comprises
a second information file conversion unit configured to convert the information file selected by the information file selection unit into the information file in the predetermined form, and
a transmission destination selection unit configured to select a transmission destination of the information file selected by the information file selection unit or an information file in the predetermined form, which is converted by the second information file conversion unit among the first storage unit and the second storage unit; and the storage management unit of the information storage device stores the information file in the predetermined form, which is transmitted from the external device to the selected second storage unit via the wide area information network, in the second storage unit if the information file is the information file in the predetermined form, or converts the information file into the predetermined form with the file conversion unit and stores the information file in the second storage unit if the information file is in a form different from the predetermined form.

12. The information service system according to claim 11, wherein:

the information storage device further comprises
a member database configured to store information about the member, and
a member management unit configured to register member identification information for identifying the member to the member database by a member registration request received via the wide area information network, and to set a second storage area available to the member whose member identification information is registered to the member database in the second storage unit;

the external device further comprises
a device information memory configured to store device identification information for identifying the external device, and user identification information for identifying a user of the external device;

the member management unit of the information storage device comprises
a first storage setting unit configured to set a first storage area used by the member identified with the user identification information included in a storage area purchase request received via the wide area information network to be available in the first storage unit for a predetermined duration by a capacity specified by the storage area purchase request, and
a charging management unit configured to charge a cost needed to set the first storage area to the member identified with the member identification information included in the storage area purchase request.

13. The information service system according to claim 12, wherein;

the external device further comprises
a device registration request transmission unit configured to transmit a device registration request including the device identification information and the user identification information, which are stored in the device information memory, to the information storage device via the wide area information network;

the member management unit comprises a device information registration unit configured to register the device identification information included in the device registration request received via the wide area information network in association with the member identification information included in the device registration request; and the member management unit adds a storage space of a size according to the device identification information registered by the device information registration unit to the second storage area that is allocated to a member identified with the member identification information.

14. The information service system according to claim 13, wherein the member management unit causes the first storage setting unit to extract a third storage area that reaches an expiry date within the first storage area included in the first storage unit, and to set the expiry date of the third storage area to extend by a predetermined duration, and the member management unit causes the charging management unit to charge a cost needed to extend the expiry date by the predetermined duration to the member who uses the third storage area.

15. The information service system according to claim 14, wherein the storage management unit stores a copy of the information file stored in the second storage unit in a backup storage device connected to the information storage device via a local area network (LAN), also stores a copy of the information file stored in the first storage unit in the backup storage device, and further stores a copy in a remote backup storage device that is installed geographically remote from the backup storage device.

16. The information service system according to claim 15, wherein the storage management unit stores the copy of the information file stored in the second storage unit in the backup storage device via a local area information network, stores the copy of the information file stored in the first storage unit in the backup storage device via the local area information network, and stores the copy in the remote backup storage device via the wide area information network.

17. The information service system according to claim 14, wherein:

the external device further comprises an information file storage request transmission unit configured to transmit an information file storage request including device identification information stored in the device information memory along with the information file stored on the storage medium to the information storage device via the wide area information network;

the information storage device further comprises an external device identification unit configured to identify the external device, which has transmitted the information file storage request, according to the device identification information included in the information file storage request received via the wide area information network; and the storage management unit stores the information file included in the information file storage request in the first storage area or the second storage area according to storage destination information preset for the external device that has transmitted the storage request identified by the external device identification unit.

18. The information service system according to claim 14, wherein
the external device further comprises
an information file deletion unit configured to delete an information file stored on the storage medium, and
an information file storage request transmission unit configured to transmit an information file storage request including a copy of the information file stored on the storage medium to the information storage unit via the wide area information network by specifying the first storage area;
the storage management unit stores a second information file included in the information file storage request received via the wide area information network, and transmits, to the external device via the wide area information network, deletion permission information representing permission of an information file at a copy source of the second information file;
the deletion unit deletes the information file at the copy source of the second information file according to the deletion permission information received via the wide area information network, and transmits, to the information storage device, the deletion of the information file at the copy source of the second information file; and
the storage management unit prohibits the second information file in the second storage area from being deleted.

* * * * *